US011035571B2

(12) United States Patent
Aoki et al.

(10) Patent No.: US 11,035,571 B2
(45) Date of Patent: Jun. 15, 2021

(54) PIPING CONNECTION UNIT, AIR SUPPLY OR EXHAUST TUBE, AND COMBUSTION APPARATUS

(71) Applicant: PURPOSE CO., LTD., Fuji (JP)

(72) Inventors: Toshiaki Aoki, Fuji (JP); Tetsuya Oishi, Fuji (JP)

(73) Assignee: PURPOSE CO., LTD., Fuji (JP)

( * ) Notice: Subject to any disclaimer, the term of this patent is extended or adjusted under 35 U.S.C. 154(b) by 393 days.

(21) Appl. No.: 16/025,247

(22) Filed: Jul. 2, 2018

(65) Prior Publication Data

US 2019/0017701 A1 Jan. 17, 2019

(30) Foreign Application Priority Data

Jul. 13, 2017 (JP) .............................. JP2017-136945

(51) Int. Cl.
*F16L 5/10* (2006.01)
*F23J 13/04* (2006.01)
*F23J 13/02* (2006.01)

(52) U.S. Cl.
CPC .................. *F23J 13/04* (2013.01); *F16L 5/10* (2013.01); *F23J 13/025* (2013.01); *F23J 2213/202* (2013.01); *F23J 2213/40* (2013.01)

(58) Field of Classification Search
CPC ......... F16L 33/04; F16L 338/08; F16L 33/10; F16L 33/207; F16L 33/2071; F16L 5/10; F16L 21/005; F16L 21/065; F16L 21/02; F16L 33/08
USPC ....................................................... 285/322
See application file for complete search history.

(56) References Cited

U.S. PATENT DOCUMENTS

| | | | | |
|---|---|---|---|---|
| 2,080,988 A | * | 5/1937 | Schulz ................... | F02M 35/04 285/322 |
| 2,165,926 A | * | 7/1939 | Greene ................... | F16L 33/04 285/8 |
| 2,702,716 A | * | 2/1955 | Basolo ................... | F16L 21/022 285/322 |
| 4,983,784 A | * | 1/1991 | Whitlock ................ | F16L 5/06 174/652 |
| 5,190,322 A | * | 3/1993 | Hughes ................... | F16L 21/02 285/236 |

(Continued)

FOREIGN PATENT DOCUMENTS

JP          1377612 S    1/2010

*Primary Examiner* — David Bochna
(74) *Attorney, Agent, or Firm* — Westerman, Hattori, Daniels & Adrian, LLP

(57) ABSTRACT

A piping connection unit of a combustion apparatus supplying and discharging air through a duct includes an apparatus-side connecting part, a connecting part and a spacer. The apparatus-side connecting part is to be connected to an air supply part or an exhaust part of the combustion apparatus. The connecting part has a diameter larger than a diameter of the apparatus-side connecting part, and communicates with the apparatus-side connecting part to be connected to a duct to be inserted from an opening part. The spacer is detachably disposed in the connecting part. The spacer is disposed between an inner wall of the connecting part and the duct to be inserted when the duct has a pipe diameter smaller than an inner diameter of the connecting part. The spacer is removed from the connecting part when the duct has a pipe diameter equivalent to the inner diameter of the connecting part.

14 Claims, 20 Drawing Sheets

(56) References Cited

U.S. PATENT DOCUMENTS

| | | | | |
|---|---|---|---|---|
| 5,547,232 | A * | 8/1996 | Waterman | F16L 21/00 |
| | | | | 285/236 |
| 5,927,892 | A * | 7/1999 | Teh-Tsung | H02G 3/0675 |
| | | | | 285/322 |
| 6,511,290 | B1 * | 1/2003 | Gatley, Jr. | F23L 5/02 |
| | | | | 285/322 |
| 7,504,582 | B1 * | 3/2009 | Chiu | H02G 3/0675 |
| | | | | 285/322 |
| 7,963,567 | B2 * | 6/2011 | Gallardo | F16L 5/08 |
| | | | | 285/140.1 |
| 8,251,036 | B2 * | 8/2012 | Williams | F02M 35/10144 |
| | | | | 123/184.24 |
| 10,006,417 | B2 * | 6/2018 | Satarino | F16L 21/007 |
| 2004/0094951 | A1 * | 5/2004 | Sigrist | F16L 5/06 |
| | | | | 285/139.1 |
| 2005/0099003 | A1 * | 5/2005 | Tarara | F16L 21/005 |
| | | | | 285/236 |
| 2009/0174154 | A1 * | 7/2009 | Chiu | F16L 5/00 |
| | | | | 277/603 |
| 2011/0018263 | A1 * | 1/2011 | Ignaczak | F16L 21/065 |
| | | | | 285/374 |

\* cited by examiner

PIPING CONNECTION UNIT, AIR SUPPLY OR EXHAUST TUBE, AND COMBUSTION APPARATUS

CROSS-REFERENCE TO RELATED APPLICATIONS

This application is entitled to the benefit of priority of Japanese Patent Application No. 2017-136945, filed on Jul. 13, 2017, the contents of which are hereby incorporated by reference.

BACKGROUND OF THE INVENTION i) Field of the Invention

The present disclosure relates to a piping technique for pipes allowing supply air and exhaust air for a combustion apparatus to flow.

ii) Description of the Related Art

A combustion apparatus such as an indoor installation water heater takes in an outside air for air supply and discharges a combustion exhaust into outdoors for stabilization of a combustion state and for enhancement of user's safety against combustion. However, the installation position of the water heater is not necessarily a position at which an air supply part and an exhaust part can be arranged outdoors. Consequently, a position of installation of the combustion apparatus is determined in a building, and a duct leading to the outside is arranged in advance at or near the installation position. This duct has an indoor-side end portion connected to the air supply part or the exhaust part and the other end disposed outdoors. Through this duct, the combustion apparatus supplies air from the outside and discharges air to the outside.

For an air supply or exhaust tube connecting an external duct to the combustion apparatus in this way, there is an air supply or exhaust tube having an opening part formed on one end side and an opening part formed on the other end side, the opening part on one end side is for connection to the water heater, a diameter of the opening part on the other end side is larger than the water heater side, and the air supply or exhaust tube is for connection to an exhaust pipe leading to the outside (for example, Japanese Design Registration No. 1377612).

BRIEF SUMMARY OF THE INVENTION

To supply air from and discharge air to the outside air, it is necessary to match an air supply part or an exhaust part included in a combustion apparatus with a pipe diameter of a duct installed in a building. The pipe diameter of the duct smaller than that of the air supply part or the exhaust part may make it impossible to connect the duct and the combustion apparatus or to supply or discharge a required amount of air due to insufficient flow of air. Combustion apparatuses may have air supply parts or exhaust parts different in opening diameter, for example, between products of different manufactures or between old and new apparatuses due to improvement in combustion performance, exhaust efficiency, etc.

Ducts are arranged to penetrate, for example, walls and ceilings of a building and thus are often installed when the building is built or renovated inside. If a diameter of a pipe of an apparatus to be installed is different from a diameter of a duct, the duct must be replaced; however, this may require repairs of not only the duct but also a portion of the building such as a wall in which the duct is installed, so that workload and cost may increase.

If the installed duct has a diameter larger than that of the air supply part or the exhaust part, a joint component having an opening diameter made larger on one end side and an opening diameter made smaller on the other end side must be disposed to reduce a pipe diameter between the duct and the apparatus. If this joint component is used, a small-diameter pipe must newly be disposed between the air supply part or the exhaust part and the joint component, so that cost etc. may increase due to an increased number of components. Moreover, the joint component has a fixed diameter on the duct side. Consequently, every time a combustion apparatus is introduced, the joint component is detached from or attached to the air supply part or the exhaust part depending on the diameter of the duct installed in the building and the diameter on the apparatus side, so that a piping workload increases as a problem.

An object of the present disclosure is to improve connectivity between an air supply or exhaust duct installed in a building and an air supply or exhaust part of a combustion apparatus, for example.

Another object of the present disclosure is to reduce a workload of installation of a combustion apparatus, for example.

An aspect of a piping connection unit of the present disclosure is a piping connection unit of a combustion apparatus supplying and discharging air through a duct. The piping connection unit includes an apparatus-side connecting part to be connected to an air supply part or an exhaust part of the combustion apparatus; a connecting part having a diameter larger than a diameter of the apparatus-side connecting part, and communicating with the apparatus-side connecting part to be connected to a duct to be inserted from an opening part; and a spacer detachably disposed in the connecting part, the spacer being disposed between an inner wall of the connecting part and the duct to be inserted when the duct has a pipe diameter smaller than an inner diameter of the connecting part, the spacer being removed from the connecting part when the duct has a pipe diameter equivalent to the inner diameter of the connecting part. The piping connection unit allows the air to flow through the duct, and the air supply part or the exhaust part.

An aspect of an air supply or exhaust tube of the present disclosure is an air supply or exhaust tube of a combustion apparatus supplying and discharging air through a duct. The air supply or exhaust tube includes an air supply part allowing an outside air to flow toward a combustion part; an exhaust part allowing a combustion exhaust after heat exchange to flow; an apparatus-side connecting part connected to the air supply part or the exhaust part; a connecting part having a diameter larger than a diameter of the apparatus-side connecting part, and communicating with the apparatus-side connecting part to be connected to a duct to be inserted from an opening part; and a spacer detachably disposed in the connecting part, the spacer being disposed between an inner wall of the connecting part and the duct to be inserted when the duct has a pipe diameter smaller than an inner diameter of the connecting part, the spacer being removed from the connecting part when the duct has a pipe diameter equivalent to the inner diameter of the connecting part. The air supply or exhaust tube allows the air to flow through the duct, and the air supply part or the exhaust part.

An aspect of a combustion apparatus of the present disclosure is a combustion apparatus supplying and discharging air through a duct. The combustion apparatus includes an air supply part allowing an outside air to flow toward a combustion part; an exhaust part allowing a combustion exhaust after heat exchange to flow; an apparatus-side connecting part connected to the air supply part or the exhaust part; a connecting part having a diameter larger than a diameter of the apparatus-side connecting part, and communicating with the apparatus-side connecting part to be connected to a duct to be inserted from an opening part; and a spacer detachably disposed in the connecting part, the spacer being disposed between an inner wall of the connecting part and the duct to be inserted when the duct has a pipe diameter smaller than an inner diameter of the connecting part, the spacer being removed from the connecting part when the duct has a pipe diameter equivalent to the inner diameter of the connecting part. The combustion apparatus allows the air to flow through the duct, and the air supply part or the exhaust part.

DETAILED DESCRIPTION OF THE INVENTION

First Embodiment

[Piping Connection Unit 2]

Figure 1:
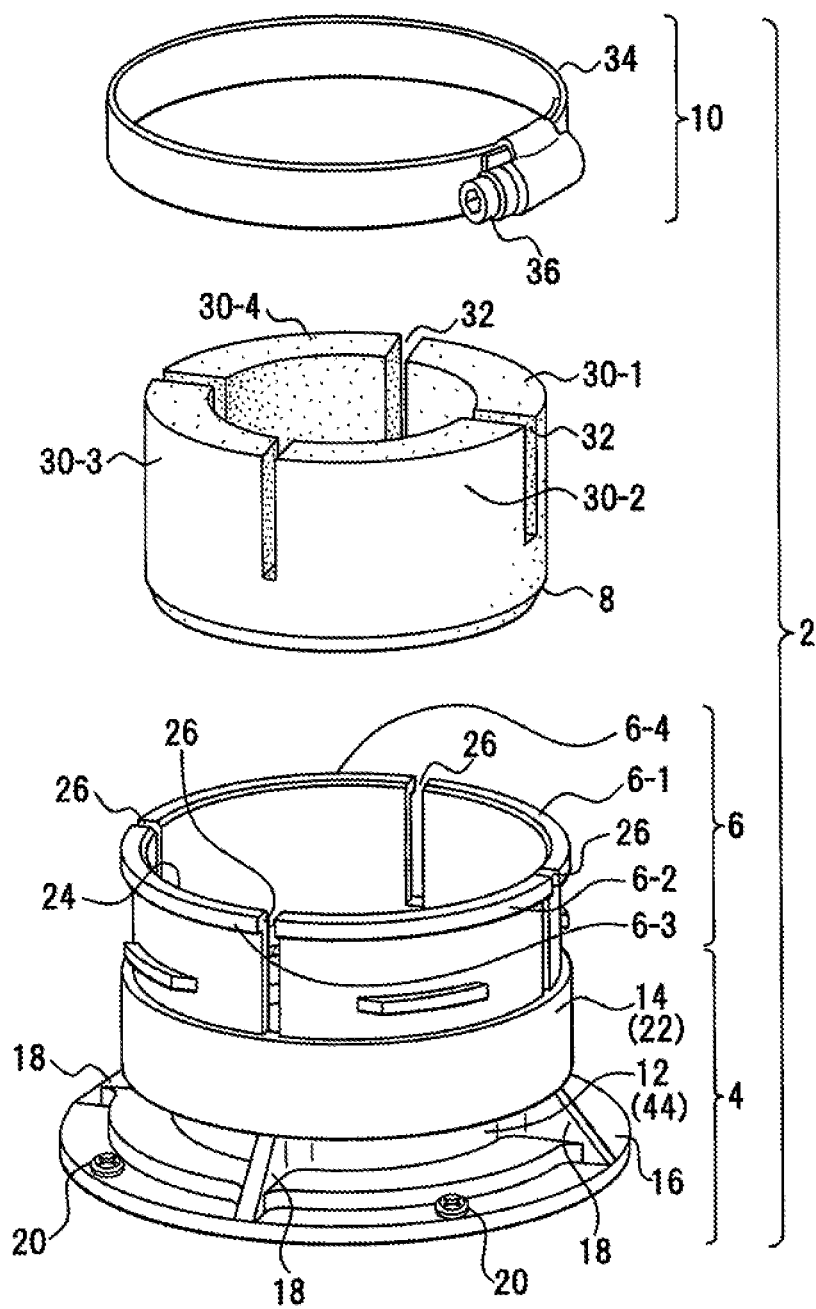
FIG. 1 is an exploded view of a configuration example of a piping connection unit according to a first embodiment.

FIG. 1 shows a configuration example of a piping connection unit according to a first embodiment. The configuration shown in FIG. 1 is an example, and the present invention is not limited to this configuration.

A piping connection unit 2 is an example of a means connecting an air supply part or an exhaust part of a combustion apparatus installed indoors and a duct guiding air from the outside or discharging air to the outside. The piping connection unit 2 enables connection of a duct having a bore diameter equivalent to the air supply part or the exhaust part as well as a duct having a different bore diameter.

The combustion apparatus includes a combustion means combusting a fuel gas, for example, and the combustion apparatus may be a water heater having a function of generating and supplying hot water by heat exchange with a combustion exhaust and a function of reheating hot water in a bathtub.

For example, as shown in FIG. 1, the piping connection unit 2 includes an apparatus housing 4, a supporting part 6 formed on one end side of the apparatus housing, a spacer 8 disposed inside the apparatus housing 4, and a fixing band 10 fastening the supporting part 6. The apparatus housing 4 and the supporting part 6 are an example of a main body part of the piping connection unit 2.

The apparatus housing 4 is an example of an apparatus main body part internally connecting one end of the air supply part or the exhaust part of the combustion apparatus and one end of the duct. The apparatus housing 4 includes two accommodating parts 22, 44 (FIGS. 3A and 3B) communicating with each other and having different opening diameters on the inside, for example. The apparatus housing 4 includes, for example, a first housing part 12 in which the air supply part or the exhaust part is partially disposed, and a second housing part 14 in which the duct is partially disposed.

The first housing part 12 and the second housing part 14 are concentric with each other, for example. Thus, the first housing part 12 and the second housing part 14 have the same central axis, for example. The first housing part 12 and the second housing part 14 are cylindrical, for example, and the inner diameter of the first housing part 12 is different from the inner diameter of the second housing part 14, for example, while the outer diameter of the first housing part 12 is different from the outer diameter of the second housing part 14, for example.

The second housing part 14 is formed to have the inner diameter and the outer diameter larger than that of the first housing part 12. Consequently, this piping connection unit 2 enables connection of the duct having a diameter larger than that of the air supply part or the exhaust part of the combustion apparatus.

The first housing part 12 includes a flange 16 and multiple ribs 18 on one end side not connected to the second housing part 14, the flange 16 is to be placed on a housing of the combustion apparatus not shown etc., and the multiple ribs 18 are disposed on an outer circumferential surface. Fastening components 20 such as bolts are disposed on the flange 16, the fastening components 20 are for fixing to the combustion apparatus not shown.

The apparatus housing 4 may integrally be made of a resin material or a metal material, for example, or may have components formed and joined by welding etc.

The supporting part 6 is an example of a means supporting the duct inserted in the second housing part 14 and has multiple supporting pieces 6-1, 6-2, 6-3, 6-4 disposed along an opening part of the second housing part 14, for example. As a result, the supporting part 6 is provided with an opening part 24 communicating with the accommodating part 22 in the second housing part 14. The supporting part 6 includes multiple slits 26 between the adjacent supporting pieces 6-1, 6-2, 6-3, 6-4, for example. The supporting pieces 6-1, 6-2, 6-3, 6-4 are made of a metal material or a resin material, for example, may integrally be formed with the opening part of the second housing part 14, and may be connected to the opening part of the second housing part 14 by welding etc. The supporting part 6 can be displaced for each of the supporting pieces 6-1, 6-2, 6-3, 6-4 due to the slits 26 interposed therebetween. For example, when pressed from the outer circumferential side, each of the supporting pieces 6-1, 6-2, 6-3, 6-4 can be displaced forward and backward in a direction toward the opening by using a joint portion with the second housing part 14 as a fulcrum. These slits 26 are formed in a direction parallel to or nearly parallel to the insertion or extraction direction of the duct to the opening part 24, for example. The displacement direction of the supporting pieces 6-1, 6-2, 6-3, 6-4 varies depending on the formation direction of the slits 26.

The spacer 8 is an example of an interval adjustment member for the accommodating part 22 and the opening part 24 into which the duct is inserted. The spacer 8 is made of an elastically deformable material having a predetermined rigidity, for example, urethane. The spacer 8 may be made of a resin material or a rubber material. The spacer 8 is arranged in the accommodating part 22 and the opening part 24 communicating with each other, thereby filling a gap between the inserted duct and the accommodating part 22 and/or between the duct and the opening part 24.

The spacer 8 is formed in a cylindrical shape, for example. Slits 32 having a predetermined depth are formed on the opening part side at one end of the spacer 8. Thus, the spacer 8 includes multiple pieces 30-1, 30-2, 30-3, 30-4. The slits 32 are formed in the same direction as the slits 26 between the supporting pieces 6-1, 6-2, 6-3, 6-4, for example.

The fixing band 10 is an example of a pressing means of the present disclosure and includes, for example, a band part 34 and an inner diameter adjusting part 36. The band part 34 is formed into a circular shape by overlapping both ends of a belt-shaped metal material. The inner diameter adjusting part 36 supports both overlapping ends of the band part 34 and changes the inner diameter of the circle formed by the band part 34 through increase and decrease of the overlapping amount thereof to fasten the supporting pieces 6-1, 6-2, 6-3, 6-4 of the supporting part 6. The fixing band 10 may be, for example, a metal hose clamp or a buckle capable of adjusting an overlap of bands.

Figure 2:
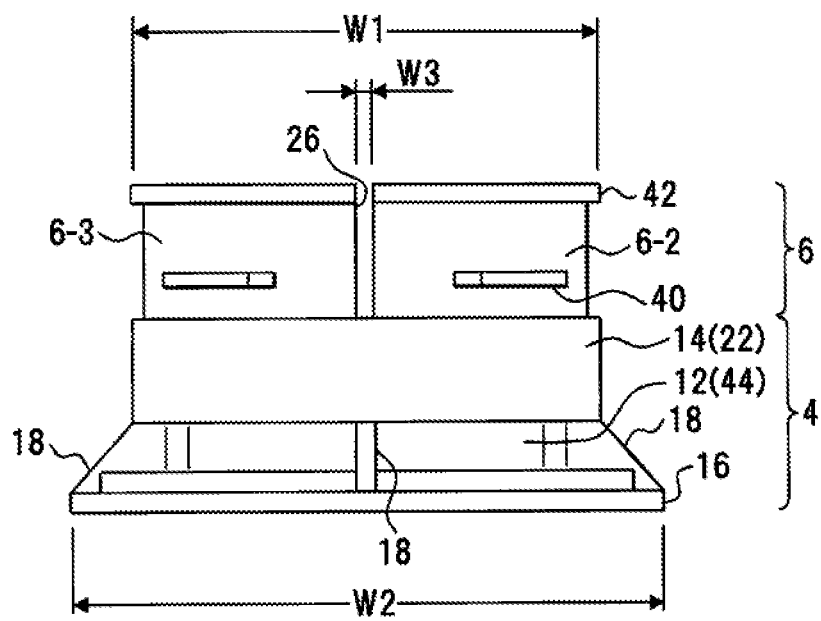
FIG. 2 is a front view of a main body part of the piping connection unit.

For example, as shown in FIG. 2, each of the supporting pieces 6-2, 6-3 has an edge part 42 having a predetermined thickness formed on the opening end side of the main body part of the piping connection unit 2. The edge parts 42 enhances the strength of opening ends of the supporting pieces 6-2, 6-3, for example. A formation width W1 of the supporting part 6 including the edge parts 42 is set smaller than a width W2 of the flange 16 on the other end side of the main body part, for example. The main body part has the apparatus housing 4 and the supporting part 6 formed bilaterally symmetrically, for example.

Additionally, the supporting pieces 6-2, 6-3 include projecting parts 40 having a predetermined width projecting in the outer circumferential direction. The projecting parts 40 are formed at positions providing a width between the positions and the edge parts 42 such that the band part 34 of the fixing band 10 can be disposed in the width, for example. Thus, the projecting parts 40 are an example of a means positioning the fixing band 10 and fixing the arrangement position of the fixing band 10.

Additionally, a width W3 of the slit 26 between the supporting pieces 6-2, 6-3 is set such that the supporting pieces 6-2, 6-3 can be displaced independently of each other, for example.

The main body part of the piping connection unit 2 has the same shape as that of FIG. 2 on both sides and the back side. Thus, similarly to the supporting pieces 6-2, 6-3, the supporting pieces 6-1, 6-4 not shown are provided with the edge parts 42 and the projecting parts 40 on the outer circumferential surfaces. A formation width of the projecting parts 40 formed on the supporting pieces 6-1, 6-2, 6-3, 6-4 is equal to or greater than the width of the edge parts 42. The projecting parts 40 having the same height are formed.

Figure 3A:
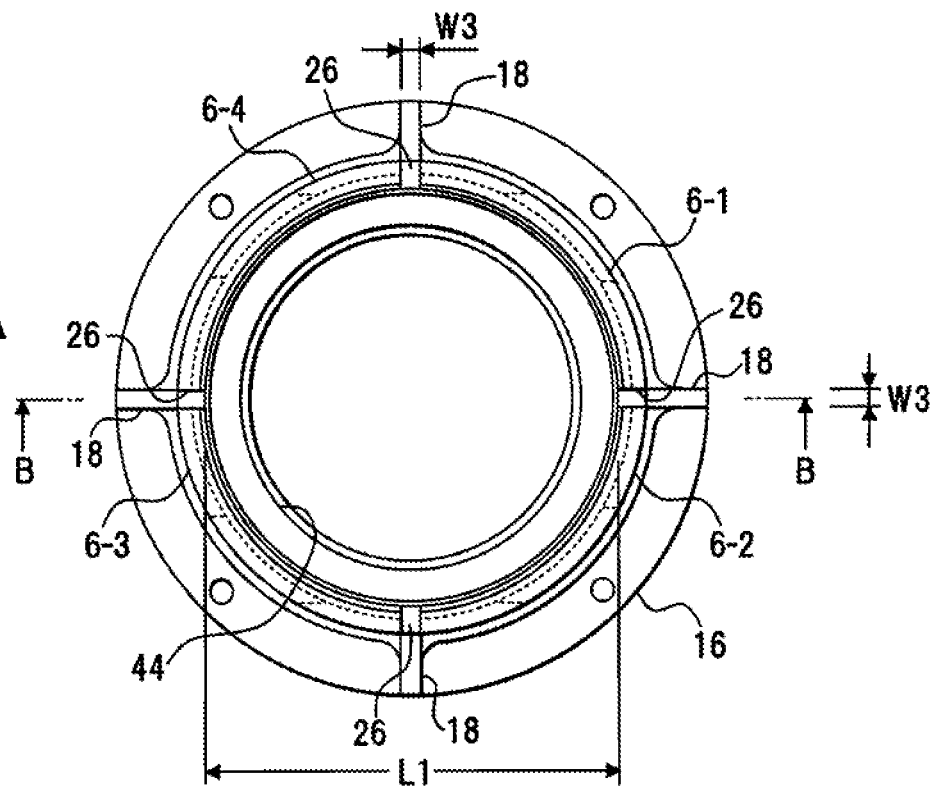
FIG. 3A is a plane view of the main body part without a spacer.
Figure 3B:
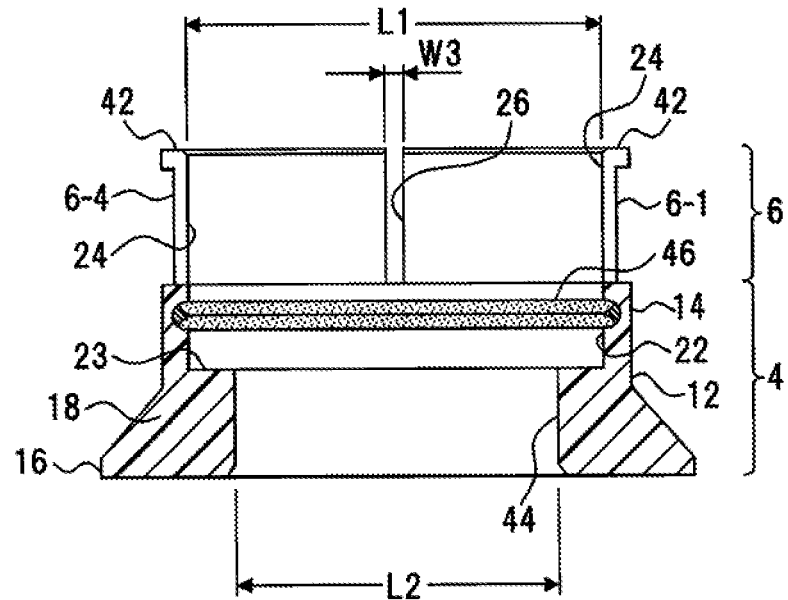
FIG. 3B is a cross-sectional view taken along a line B-B of FIG. 3A.

FIG. 3A is a plane view of the piping connection unit 2 without the spacer 8, and FIG. 3B is a cross-sectional view of FIG. 3A.

In the piping connection unit 2, the accommodating part 22 and the opening part 24 are concentric with each other. Thus, the central axis of the accommodating part 22 coincides with the central axis of the opening part 24. The accommodating part 22 and the opening part 24 are formed to have the same inner diameter L1. In the first housing part 12, the accommodating part 44 is formed to have an inner diameter L2 smaller than the inner diameter L1. The accommodating part 44 is formed concentrically with the accommodating part 22 and the opening part 24. Thus, the central axis of the accommodating part 44 coincides with the central axes of the accommodating part 22 and the opening part 24. The accommodating part 44 communicates with the accommodating part 22 and the opening part 24.

The accommodating part 44 is an example of an apparatus-side connecting part of the present disclosure, and the apparatus-side connecting part is to be connected to the air supply part or the exhaust part of the combustion apparatus. The accommodating part 22 in the second housing part 14 is an example of a connecting part of the present disclosure, and the connecting part is to be connected to the duct.

Due to a difference in inner diameter between the accommodating part 22 and the accommodating part 44, a placement surface part 23 having a predetermined width is formed between the accommodating part 22 and the accommodating part 44. A portion of the duct, or portions of the duct and the spacer 8 is/are to be placed on the placement surface part 23. The portion of duct is arranged in the accommodating part 22 and has a diameter larger than the inner diameter L2. In other words, the placement surface part 23 comes into contact with the duct, the spacer 8, etc. to function as a positioning means for a position of insertion or arrangement into the accommodating part 22 or as a stopper stopping insertion.

An O-ring 46 is disposed on an inner circumferential surface of the accommodating part 22, and the O-ring 46 comes into contact with an outer circumferential portion of the duct or the spacer 8. The O-ring 46 is an example of a first sealing means of the present disclosure, and blocks air or other substances from flowing toward the opening part 24 between the duct or the spacer 8 inserted into the accommodating part 22 and an inner wall of the accommodating part 22.

The O-ring 46, for example, may have a cross-sectional shape like a ginkgo-leaf or may have a cross-sectional shape like a circular shape or another shape in which a sealing function can be ensured.

[Example of Disposition State of the Spacer 8]

Figure 4:
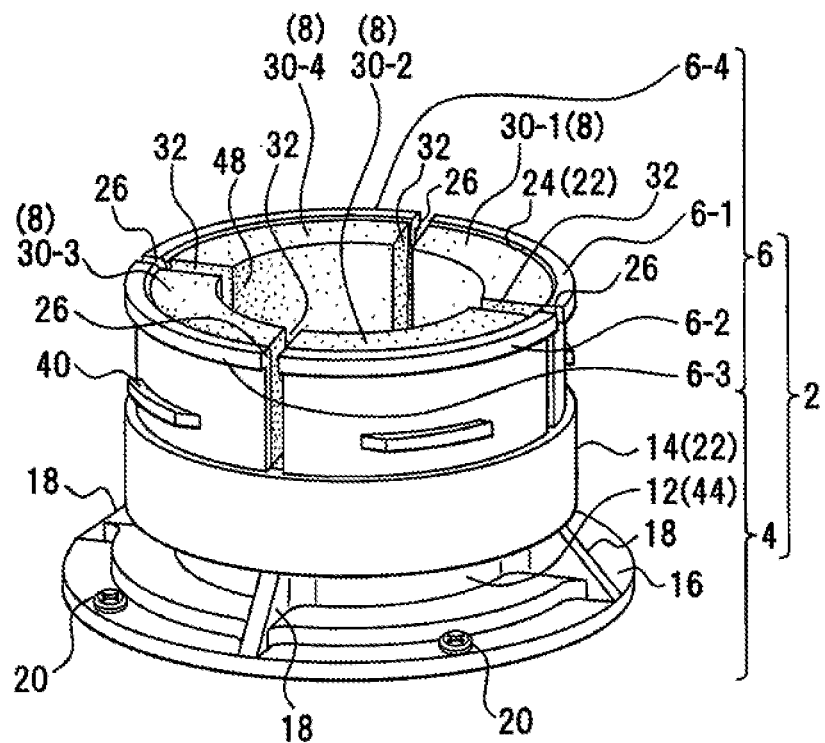
FIG. 4 is a view of an example of a state in which the spacer is disposed in the main body part.

FIG. 4 shows an example of a state in which the spacer 8 is arranged in the main body part.

The spacer 8 is inserted through the opening part 24 of the supporting part 6 and is arranged in the accommodating part 22 of the second housing part 14. The spacer 8 is arranged such that the positions of the slits 32 is matched with the slits 26 of the supporting part 6 while the pieces 30-1, 30-2, 30-3, 30-4 and the supporting pieces 6-1, 6-2, 6-3, 6-4 overlap with each other in the direction toward the central axis. The spacer 8 is arranged in the accommodating part 22 and the opening part 24 so that a hollow portion serves as an accommodating part 48 accommodating the duct.

The length of the spacer 8 is set equal to or less than a total value of the length of the accommodating part 22 and the length of the supporting part 6 in the insertion or extraction direction of the duct. The length of the spacer 8 is set longer than the length of the accommodating part 22 so that the pieces 30-1, 30-2, 30-3, 30-4 are in contact with a portion of the supporting part 6.

Figure 5A:
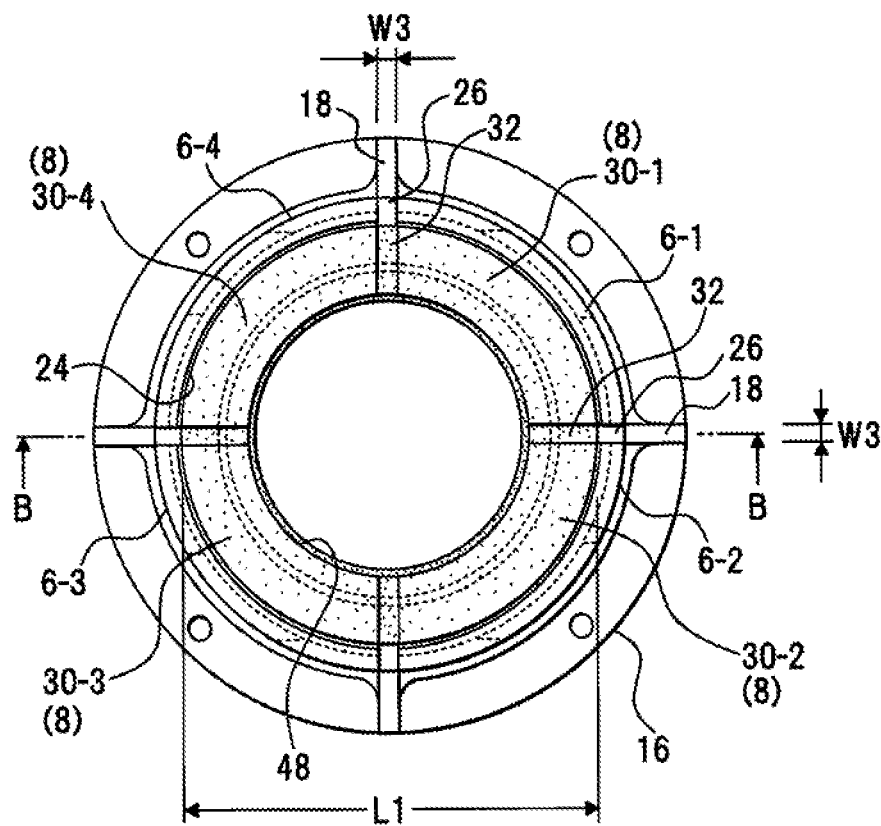
FIG. 5A is a plane view of the main body part with the spacer disposed in the main body part.
Figure 5B:
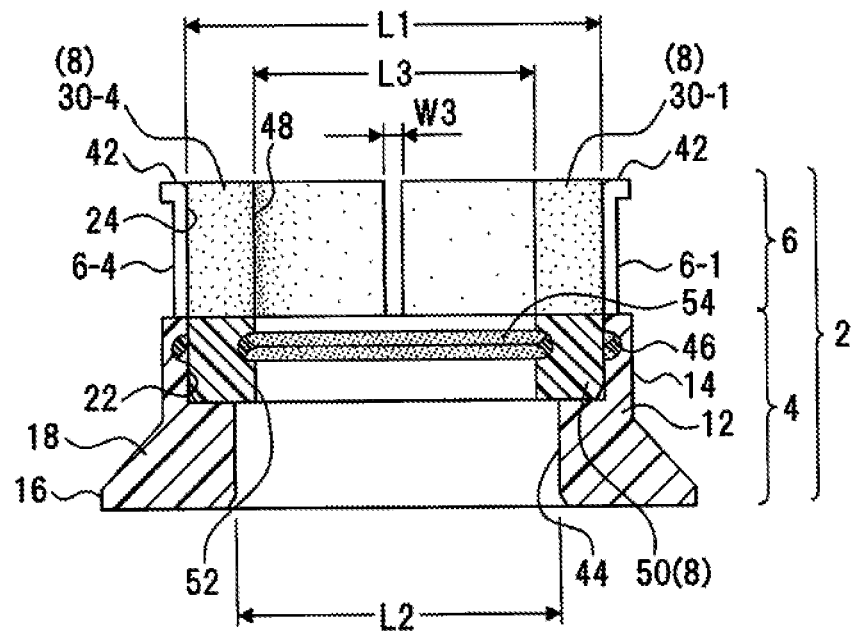
FIG. 5B is a cross-sectional view taken along a line B-B of FIG. 5A.

FIG. 5A is a plane view of the piping connection unit 2 with the disposed spacer 8, and FIG. 5B is a cross-sectional view of FIG. 5A.

The spacer 8 has a uniform thickness in the circumferential direction, and when the outer circumferential portion of the spacer 8 comes into contact with the accommodating part 22 and the opening part 24, the accommodating part 48 is formed concentrically with the accommodating part 22, the opening part 24, and the accommodating part 44. Thus, the central axis of the accommodating part 48 coincides with the central axes of the accommodating part 22, the opening part 24, and the accommodating part 44.

An inner diameter L3 of the accommodating part 48 is smaller than the inner diameter L2 of the accommodating part 44 as shown in FIG. 5B, for example.

In the spacer 8, for example, the length of the slits 32 is set equivalent to the length of the supporting part 6, so that the length of the pieces 30-1, 30-2, 30-3, 30-4 is made equivalent to the length of the supporting part 6. The spacer 8 includes an annular part 50 not having the slit 32 in the accommodating part 22, for example. The annular part 50 is an example of a means connecting a small-diameter duct inserted in the accommodating part 48 to the accommodating part 22 serving as a connecting part. Thus, an accommodating part 52 formed in the annular part 50 is a portion of the accommodating part 48 and is an example of a second connecting part connected via the annular part 50 to the small-diameter duct.

An O-ring 54 is disposed on an inner circumferential surface of the annular part 50, and the O-ring 54 comes into contact with an outer circumferential portion of the small-diameter duct. The O-ring 54 is an example of a second sealing means of the present disclosure, and blocks air or other substances from flowing toward the accommodating part 48 between the duct inserted into the accommodating part 52 and an inner wall of the accommodating part 52. The O-ring 54, for example, may have a cross-sectional shape like a ginkgo-leaf or may have a cross section shape like a circular shape or another shape in which a sealing function can be ensured.

Figure 6A:
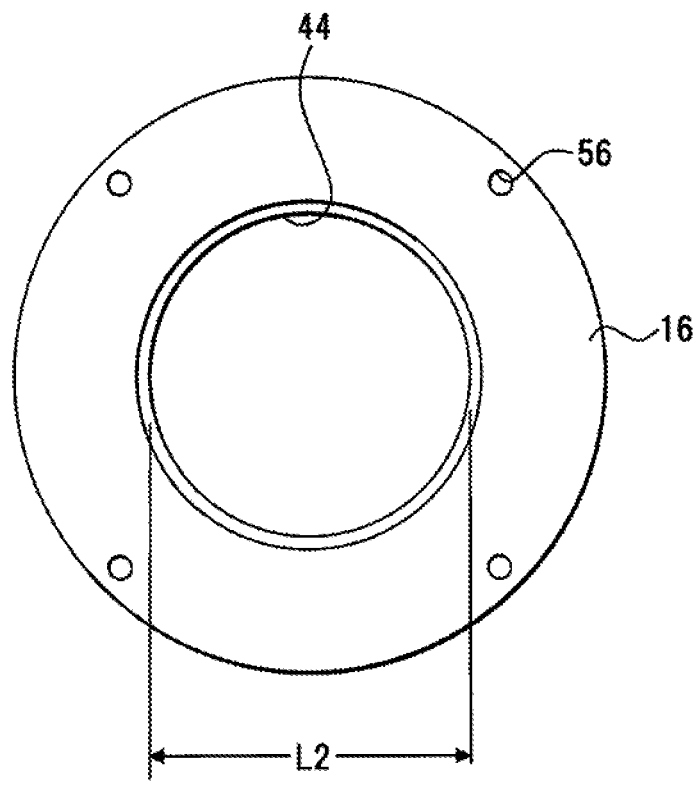
FIGS. 6A and 6B are views of a bottom surface of the main body part.
Figure 6B:
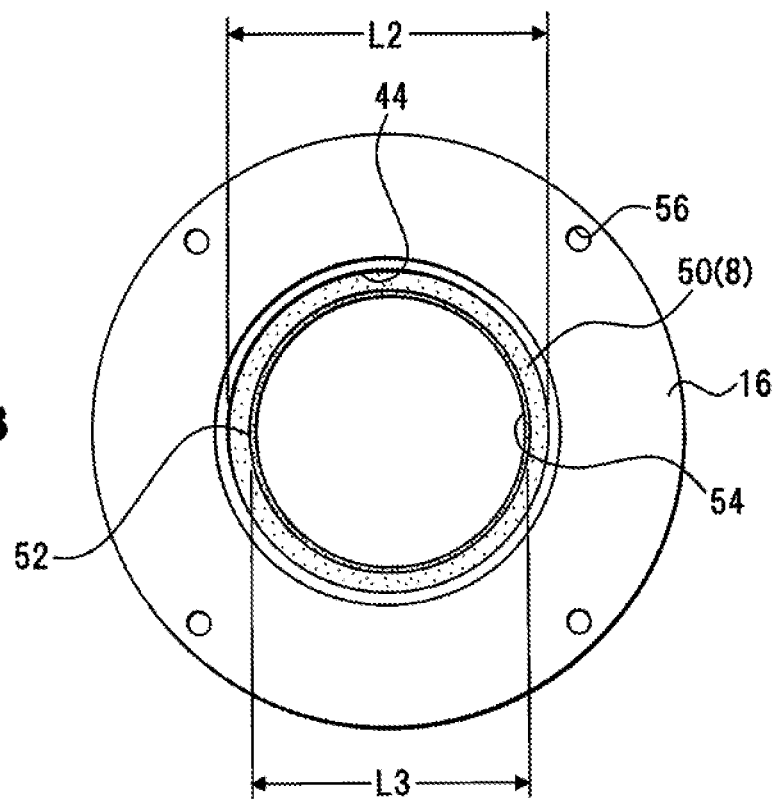

FIGS. 6A and 6B show a bottom surface of the piping connection unit 2.

For example, as shown in FIG. 6A, when the spacer 8 is not disposed in the accommodating part 22, the main body part of the piping connection unit 2 has the accommodating part 44 exposed from an opening portion of a bottom part and is in a penetrated state to the opening part 24 side of the supporting part 6.

For example, as shown in FIG. 6B, when the spacer 8 is disposed in the accommodating part 22, the annular part 50 is partially exposed through the accommodating part 44 in the main body part and the accommodating part 52 having an inner diameter L3 is exposed inside the annular part 50.

Additionally, the flange 16 of the piping connection unit 2 includes multiple holes 56 for allowing the fastening components 20 to penetrate therethrough.

[When Small-Diameter Duct is Disposed]

Figure 7A:
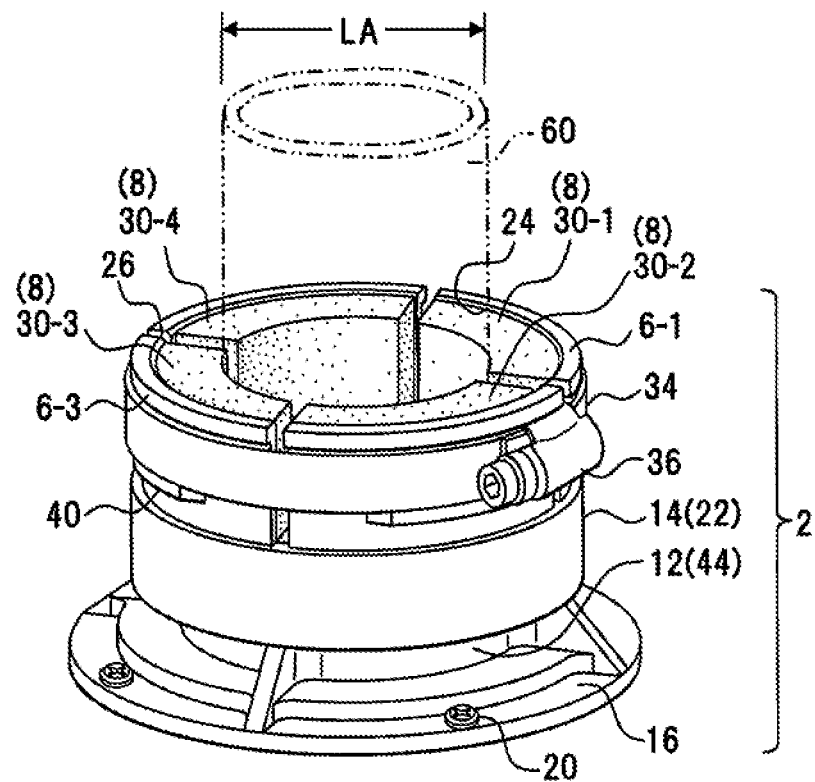
FIG. 7A is a view of an example of the piping connection unit when a small-diameter duct is disposed.
Figure 7B:
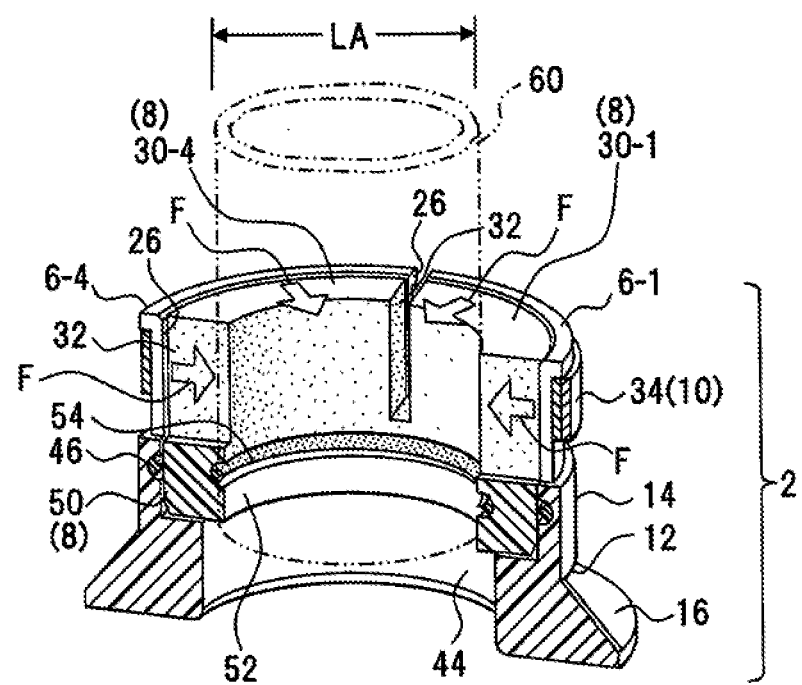
FIG. 7B is a view of an example of a pressing state for the duct to be connected.

FIGS. 7A and 7B show a configuration example when a small-diameter duct is disposed. The configuration shown in FIGS. 7A and 7B is an example.

A duct 60 is inserted in the piping connection unit 2, and the duct 60 has a pipe diameter LA smaller than the inner diameter L1 of the accommodating part 22 of the second housing part 14 and the opening part 24 of the supporting part 6, for example. In the piping connection unit 2, for example, as shown in FIG. 7B, the duct 60 is inserted through the opening part 24 to a position on the end portion side of the accommodating part 52 of the annular part 50.

When the duct 60 is inserted to a predetermined position, for example, the end portion of the accommodating part 52, the inner diameter of the circular ring formed by the band part 34 is reduced by tightening the inner diameter adjusting part 36 of the fixing band 10, for example. As the inner diameter of the circular ring is reduced, the band part 34 presses the supporting pieces 6-1, 6-2, 6-3, 6-4. A pressing force F applied from the supporting pieces 6-1, 6-2, 6-3, 6-4 is applied by, for example, the supporting pieces 6-1, 6-2, 6-3, 6-4, to an outer circumferential surface of the duct 60 via the pieces 30-1, 30-2, 30-3, 30-4 of the spacer 8 in the direction toward the central axis of the opening part 24. As a result, the duct 60 is pressed at the outer circumferential surface thereof and thereby supported at least in a contact portion with the spacer 8.

[When Large-Diameter Duct is Disposed]

Figure 8A:
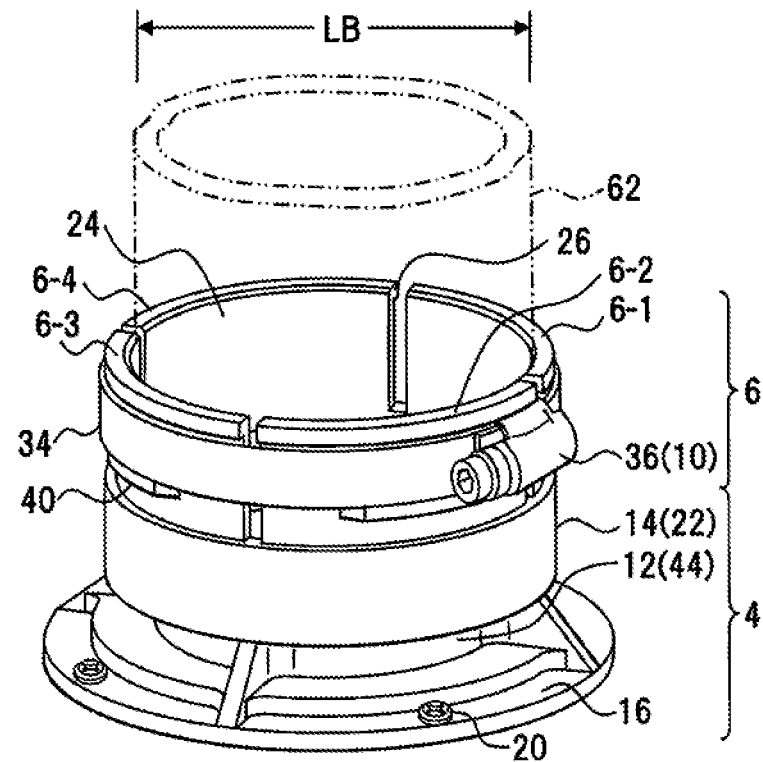
FIG. 8A is a view of an example of the piping connection unit when a large-diameter duct is disposed.
Figure 8B:
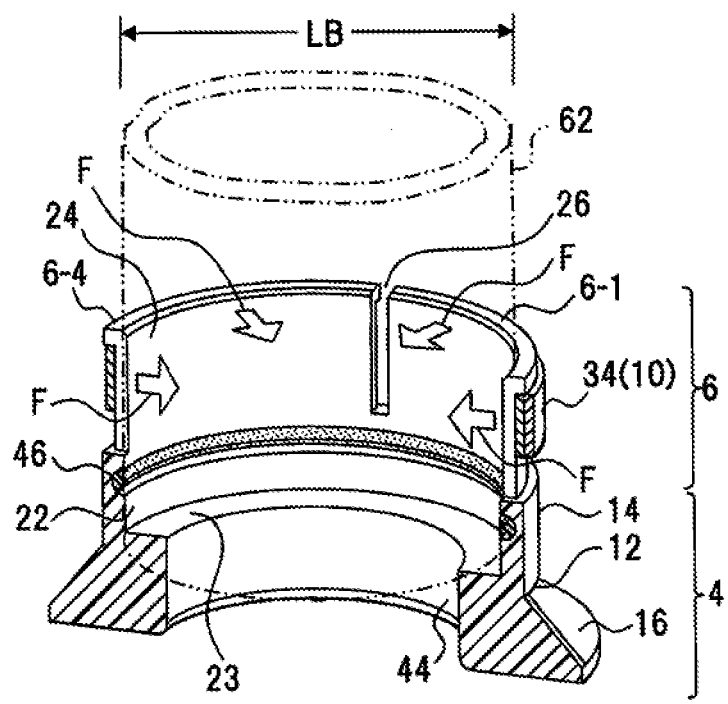
FIG. 8B is a view of an example of a pressing state for the duct to be connected.

FIGS. 8A and 8B show a configuration example when a large-diameter duct is disposed. The configuration shown in FIGS. 8A and 8B is an example.

A duct 62 is inserted in the piping connection unit 2, and the duct 62 has a pipe diameter LB equivalent to the inner diameter of the accommodating part 22 of the second housing part 14 and the opening part 24 of the supporting part 6, for example. In the case of connection to the duct 62, the spacer 8 is removed from the opening part 24, and the supporting pieces 6-1, 6-2, 6-3, 6-4 come into contact with an outer circumferential surface of the duct 62. Inside the main body, for example, as shown in FIG. 8B, the inner wall surface of the accommodating part 22 serving as the connecting part comes into contact with the outer circumferential surface of the duct 62. In this case, the insertion position of the duct 62 inserted in the accommodating part 22 is specified by an end portion on the inserted side arranged on the placement surface part 23.

For example, when the duct 62 is inserted to a predetermined position in the piping connection unit 2, the inner diameter of the circular ring formed by the band part 34 is reduced by tightening the inner diameter adjusting part 36 of the fixing band 10. As the inner diameter of the circular ring is reduced, the band part 34 presses the supporting pieces 6-1, 6-2, 6-3, 6-4. The pressing force F applied from the supporting pieces 6-1, 6-2, 6-3, 6-4 is directly applied to the outer circumferential surface of the duct 62, for example. As a result, the duct 62 is pressed at the outer circumferential surface thereof and thereby supported at least in the contact portion with the supporting part 6.

[Connection of Air Supply Part or Exhaust Part]

Figure 9A:
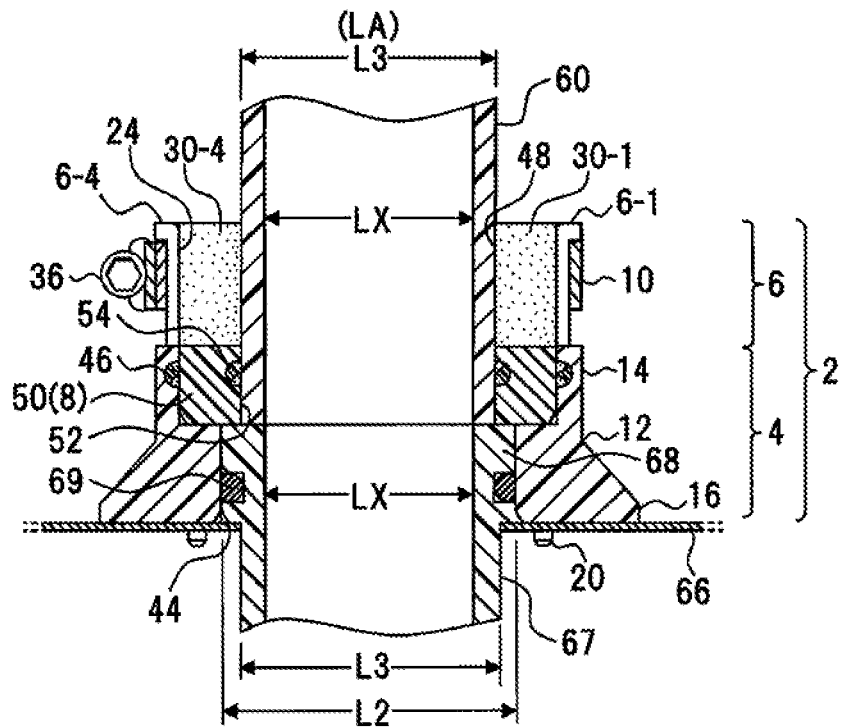
FIGS. 9A and 9B are cross-sectional views of an example of a connection state between an air supply or exhaust part on the equipment side and the duct.
Figure 9B:
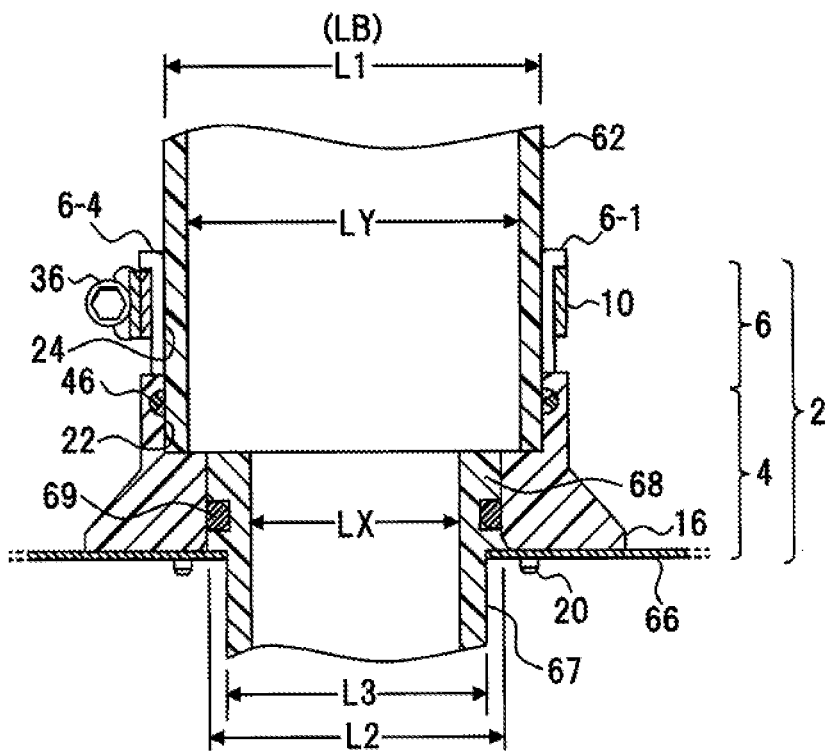

FIGS. 9A and 9B show an example of a connection state between the air supply or exhaust part and the duct.

The piping connection unit 2 has the flange 16 placed on a disposition part 66 such as a housing part of the combustion apparatus, for example, and is fixed to the disposition part 66 by the fastening components 20 via the flange 16.

In the accommodating part 44 of the first housing part 12, a connecting pipe 68 of a duct 67 of the air supply part or the exhaust part of the combustion apparatus is arranged. A sealing part 69 is disposed on an outer circumferential surface of the connecting pipe 68, and is for bringing the accommodating part 44 and the connecting pipe 68 into close contact with each other. In this duct 67, for example, the connecting pipe 68 on the end side has an inner diameter LX. The duct 62 has the same inner diameter LX as the connecting pipe 68, for example. This inner diameter LX is the minimum required pipe diameter for supplying air to or discharging air from the combustion apparatus, for example, and is two inches, for example.

When the duct 60 having the pipe diameter LA is disposed to the air supply part or the exhaust part, the connecting pipe 68 and the duct 60 communicate with each other in the accommodating part 52 of the annular part 50 as shown in FIG. 9A, for example. In this case, the duct 60 and the connecting pipe 68 have the same pipe diameter LA and are arranged concentrically with each other. In other words, the central axis of the duct 60 coincides with the central axis of the connecting pipe 68. Thus, a supply flow passage or an exhaust flow passage is formed with little level difference in a connecting portion.

When the duct 62 having the pipe diameter LB is disposed, the connecting pipe 68 and the duct 62 communicate with each other in the accommodating part 22 as shown in FIG. 9B, for example. The duct 62 has an inside diameter LY of three inches, for example. In this case, the duct 62 and the connecting pipe 68 are concentrically arranged. In other words, the central axis of the duct 62 coincides with the central axis of the connecting pipe 68. Thus, the inner wall of the air supply part or the exhaust part having the inner diameter LX is arranged inside the inner wall of the duct 62. When the duct 62 having the pipe diameter LB is disposed to the air supply part or the exhaust part, the connecting pipe 68 and the duct 62 communicate with each other in the accommodating part 22 as shown in FIG. 9B, for example.

Effects of the First Embodiment

According to this configuration, the following effects can be obtained.

(1) The air supply part or the exhaust part on the combustion apparatus side includes the connecting pipe communicating with the connecting part and being connected to the small-diameter duct via a portion of the spacer disposed in the connecting part, and a ventilation path can be formed between the duct having a different pipe diameter and the air supply part or the exhaust part.

(2) A flow passage for supplying air to, or discharging air from, the combustion apparatus can be formed by using the duct having a bore diameter different from the bore diameter of the air supply part or the exhaust part on the combustion apparatus side, so that a replacement work and cost of piping can be reduced.

(3) Since the ducts different in pipe diameter are connected to the connecting part in the housing by attaching or detaching the spacer, the piping connection unit can be reduced in size and the number of components.

(4) The arrangement positions of the ducts different in pipe diameter are maintained concentrically by using the spacer disposed inside the housing of the piping connection unit. Thus, the central axes of the ducts different in pipe diameter coincide with each other, and the arrangement positions of these ducts are maintained. Thus, a deviation in arrangement position of the duct can be prevented with respect to the air supply part or the exhaust part different in pipe diameter so as to stabilize the air supply function or the exhaust function.

(5) Since the ducts different in pipe diameter are made available for the air supply part or the exhaust part of the combustion apparatus, an installation work of the combustion apparatus can be made easier and reduced in work load.

Second Embodiment

Figure 10:
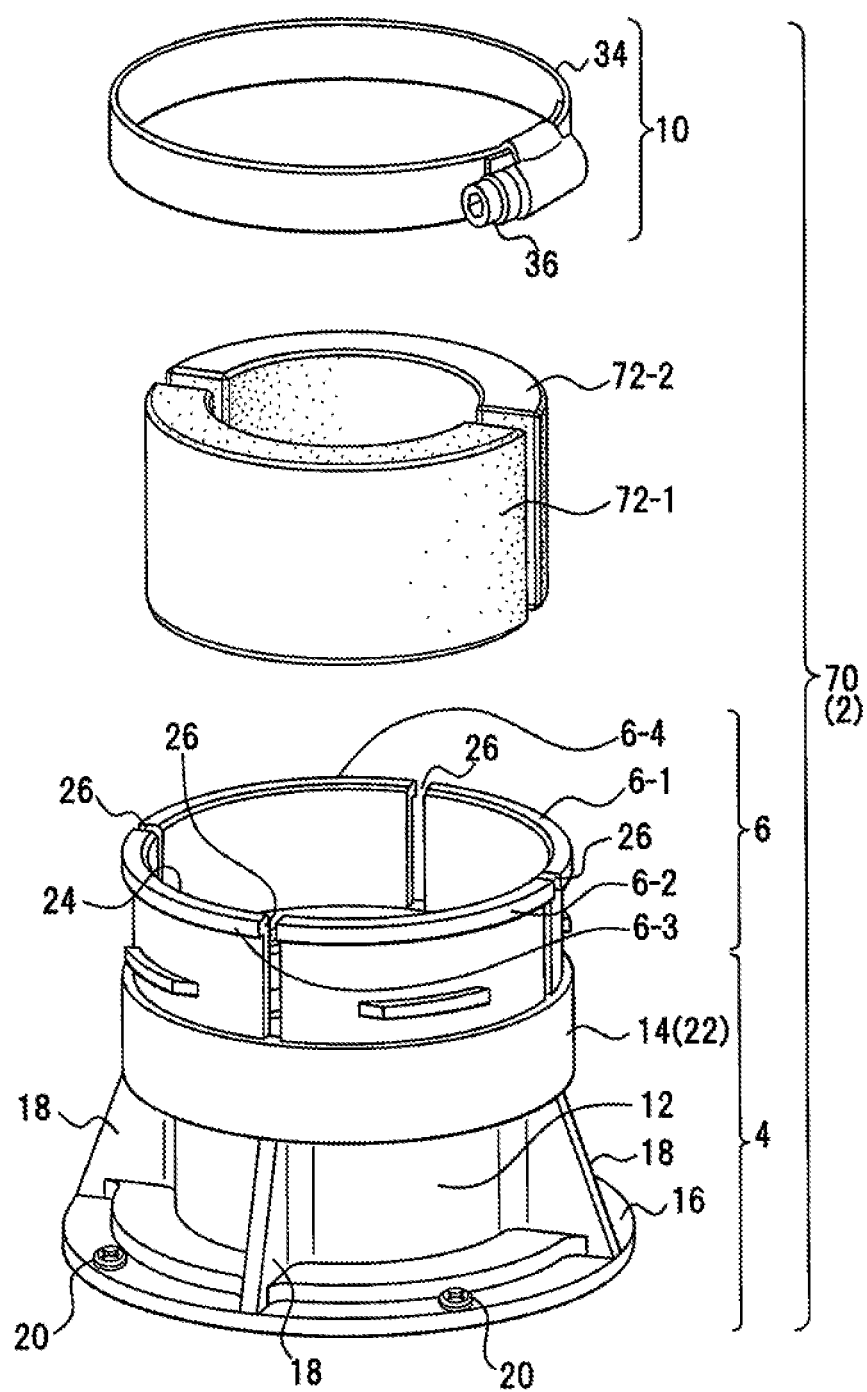
FIG. 10 is an exploded view of a configuration example of a piping connection unit according to a second embodiment.

FIG. 10 shows an exterior configuration example of a piping connection unit according to a second embodiment. In FIG. 10, the same constituent elements as FIG. 1 are denoted by the same reference numerals.

For example, as shown in FIG. 10, a piping connection unit 70 includes the apparatus housing 4, the supporting part 6, spacers 72-1, 72-2, and the fixing band 10.

The apparatus housing 4 is an example of an apparatus main body part internally connecting one end of an air supply part or an exhaust part of a combustion apparatus and one end of a duct and includes the accommodating parts 22, 44 and a penetrating part 74 (FIGS. 11A and 11B) communicating with each other and having different opening diameters.

The spacers 72-1, 72-2 are an example of an interval adjustment member for the accommodating part 22 and the opening part 24 into which the duct is inserted. The spacers 72-1, 72-2 are each formed into a hollow semicircular arc shape. When both end surfaces of the spacer 72-1 are arranged to respectively face both end surfaces of the spacer 72-2, a circular hollow portion is formed inside the spacers 72-1, 72-2.

Figure 11A:
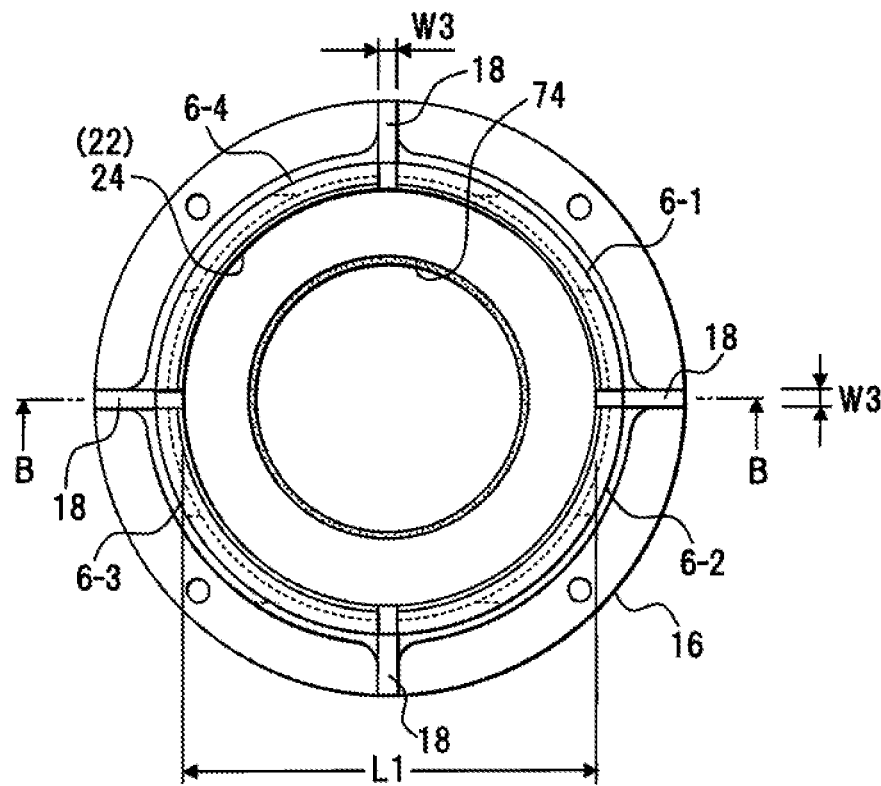
FIG. 11A is a plane view of the main body part with the spacer disposed in the main body part.
Figure 11B:
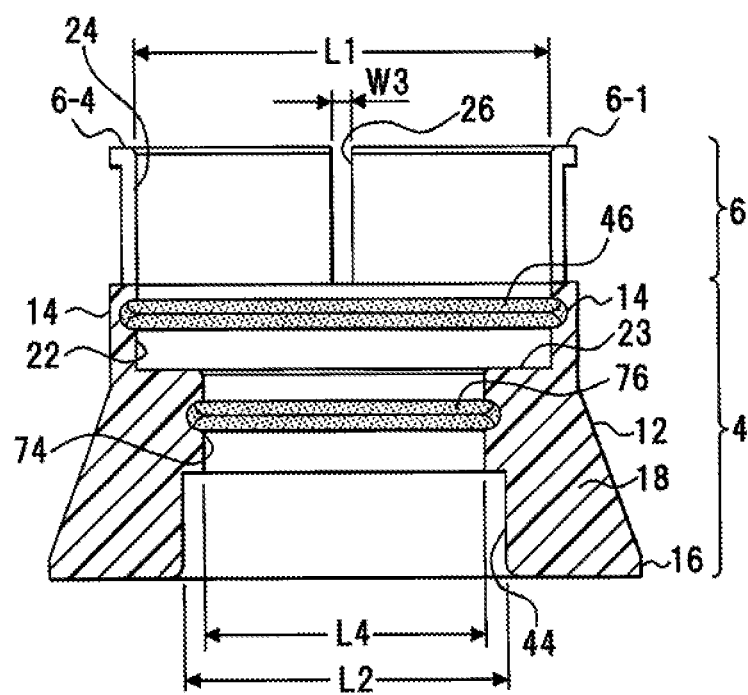
FIG. 11B is a cross-sectional view taken along a line B-B of FIG. 11A.

FIG. 11A is a plane view of the piping connection unit without the spacers, and FIG. 11B is a cross-sectional view of FIG. 11A.

In the piping connection unit 70, the accommodating part 22 in the second housing part 14 is concentric with the opening part 24 in the supporting part 6. Thus, the central axis of the accommodating part 22 coincides with the central axis of the opening part 24. The accommodating part 22 and the opening part 24 are formed to have the same inner diameter L1. The first housing part 12 of the piping connection part 12 includes the accommodating part 44 formed on the bottom side as well as the penetrating part 74 formed between the accommodating part 44 and the accommodating part 22 of the second housing part 14.

The penetrating part 74 is a pipe conduit allowing communication between the accommodating part 22 and the accommodating part 44 and has an inner diameter L4 smaller than that of the accommodating part 22 and the opening part 24 as shown in FIG. 11B, for example. The penetrating part 74 is formed concentrically with the accommodating parts 22, 44. Thus, the central axis of the penetrating part 74 coincides with the central axes of the accommodating parts 22, 44.

The penetrating part 74 is an example of a first connecting part of the present disclosure, and the duct 60 having a small pipe diameter LA defined as a first pipe diameter is inserted in the first connecting part of the present disclosure (FIG. 14), and the duct 60 is connected at an inner wall portion of the first connecting part. An O-ring 76 is disposed on an inner wall of the penetrating part 74, is as an example of a third sealing means, and comes into contact with an outer circumferential portion of the arranged duct 60.

For example, because of communication with the small-diameter penetrating part 74, the accommodating part 22 has the placement surface part 23 formed on the bottom side, and a large-diameter duct or the spacers 72-1, 72-2 is/are to be placed on the placement surface part 23.

The inner diameter L4 of the penetrating part 74 is set smaller than the inner diameter L2 of the accommodating part 44. Due to this formation, the air supply part or the exhaust part to be arranged in the accommodating part 44 cannot enter the penetrating part 74 side from the accommodating part 44.

[Example of Disposition State of the Spacers 72-1, 72-2]

Figure 12:
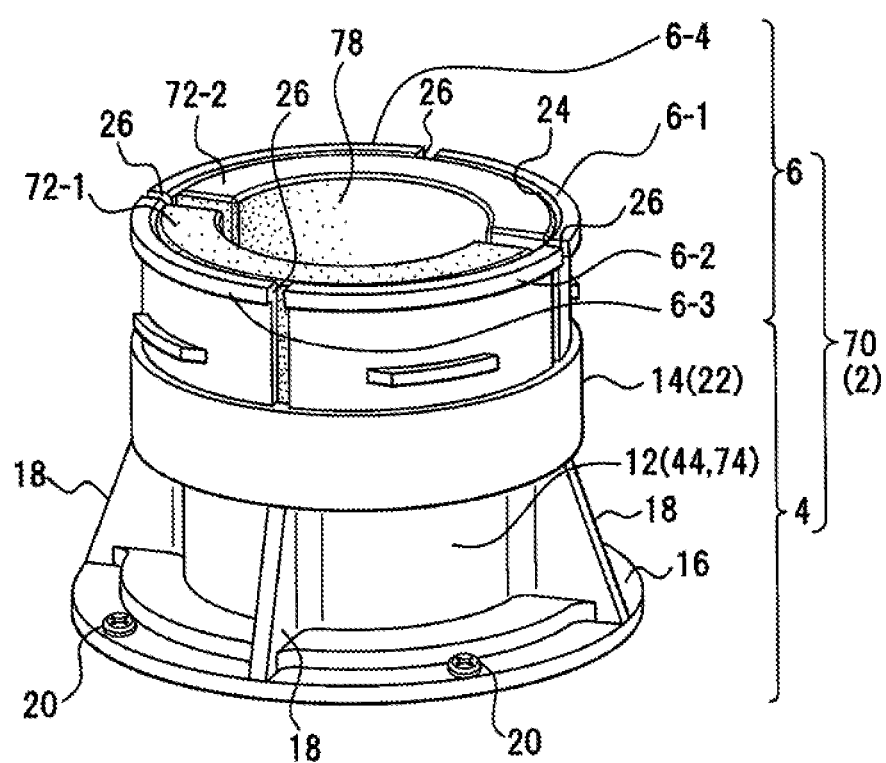
FIG. 12 is a view of an example of a state in which the spacer is disposed in the main body part.

FIG. 12 shows an example of a state in which spacers are arranged in the main body part.

The spacers 72-1, 72-2 are inserted through the opening part 24 of the supporting part 6 and are arranged in the accommodating part 22 of the second housing part 14. The spacers 72-1, 72-2 are arranged such that facing surface portions are disposed at some of the slits 26 of the supporting part 6, so that the supporting pieces 6-2, 6-3 are arranged to overlap with the spacer 72-1 in the direction toward the central axis while the supporting pieces 6-1, 6-4 are arranged to overlap with the spacer 72-2 in the direction toward the central axis. The spacers 72-1, 72-2 are arranged in the accommodating part 22 and the opening part 24 so that an accommodating part 78 accommodating the small-diameter duct 60 is formed in a hollow portion.

The length of the spacers 72-1, 72-2 is set equal to or less than a total value of the length of the accommodating part 22 and the length of the supporting part 6 with respect to the insertion or extraction direction of the duct, for example. The length of the spacers 72-1, 72-2 is set longer than the length of the accommodating part 22 and is set to a length causing contact with a portion of the supporting part 6.

Figure 13A:
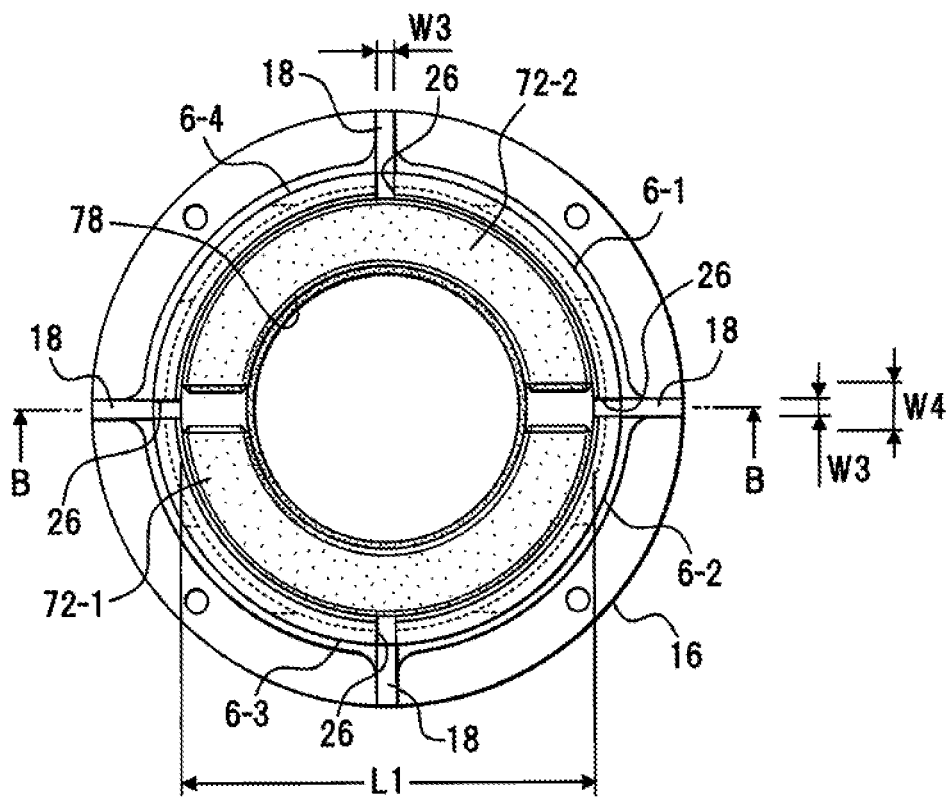
FIG. 13A is a plane view of the main body part with the spacer disposed in the main body part.
Figure 13B:
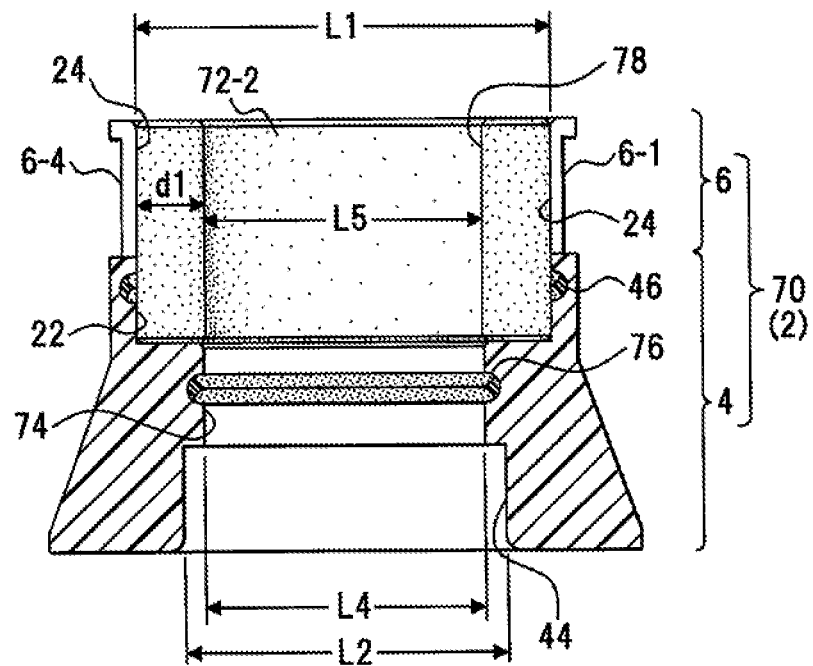
FIG. 13B is a cross-sectional view taken along a line B-B of FIG. 13A.

FIG. 13A is a plane view of the piping connection unit 70 with the spacers disposed therein, and FIG. 13B is a cross-sectional view of FIG. 13A.

The spacers 72-1, 72-2 have a uniform thickness d1 in the circumferential direction, and when the outer circumferential portions of the spacers 72-1, 72-2 come into contact with the accommodating part 22 and the opening part 24, the accommodating part 78 inside the spacers 72-1, 72-2 is formed concentrically with the accommodating part 22, the opening part 24, the accommodating part 44, and the penetrating part 74. Thus, the central axis of the accommodating part 78 coincides with the central axes of the accommodating part 22, the opening part 24, the accommodating part 44, and the penetrating part 74.

An inner diameter L5 of the accommodating part 78 is smaller than the inner diameter L2 of the accommodating part 44 as shown in FIG. 13B, for example. The inner diameter L5 of the accommodating part 78 is set to the same diameter as the inner diameter L4 of the penetrating part 74.

[When Small-Diameter Duct is Disposed]

Figure 14A:
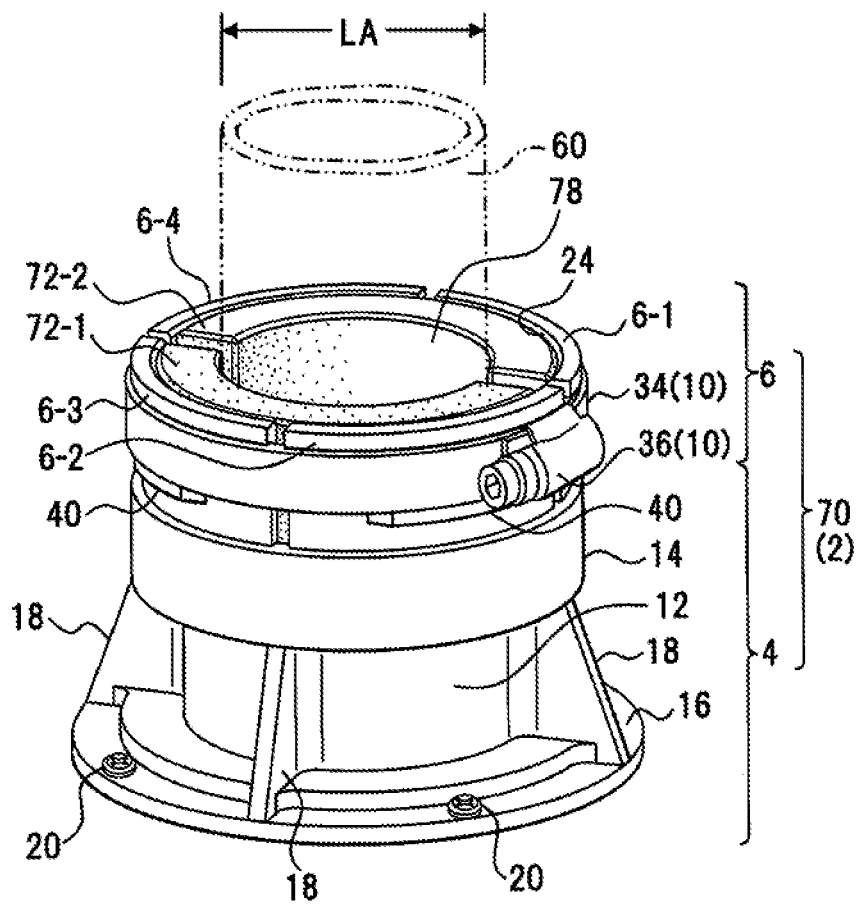
FIG. 14A is a view of an example of the piping connection unit when a small-diameter duct is disposed.
Figure 14B:
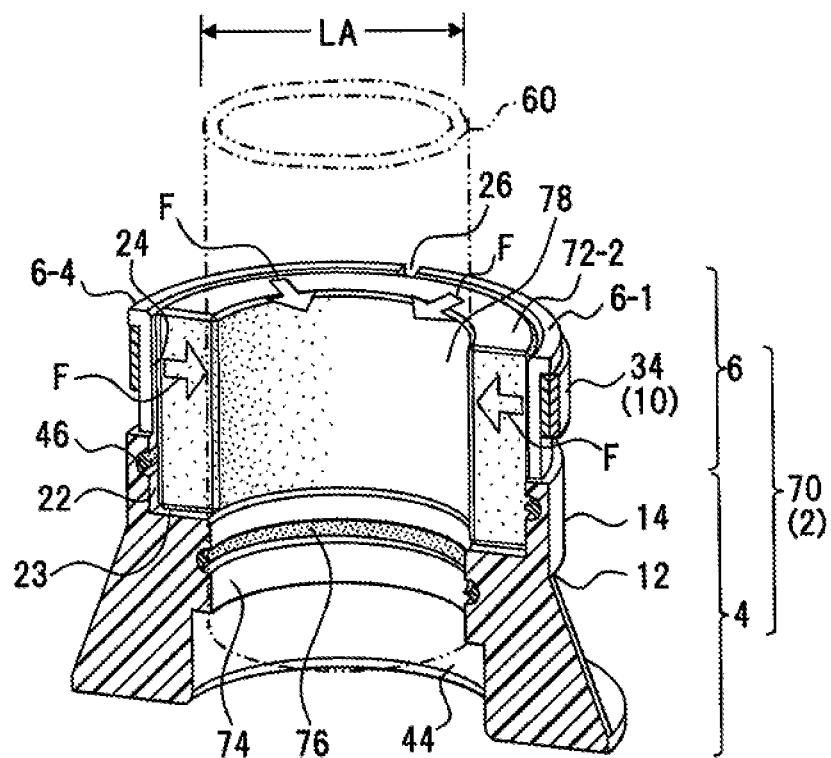
FIG. 14B is a view of an example of a pressing state for the duct to be connected.

FIGS. 14A and 14B show a configuration example when a small-diameter duct is disposed. The configuration shown in FIGS. 14A and 14B is an example.

The duct 60 is inserted in the piping connection unit 70, and the duct 60 has the pipe diameter LA smaller than the inner diameter L1 of the accommodating part 22 of the second housing part 14 and the opening part 24 of the supporting part 6, for example.

In the piping connection unit 70, for example, the duct 60 is inserted through the opening part 24 to the end portion side of the penetrating part 74.

When the duct 60 is inserted to a predetermined position, the inner diameter of the circular ring formed by the band part 34 is reduced by tightening the inner diameter adjusting part 36 of the fixing band 10, for example. The load state of the force F to the outer circumferential surface of the duct 60 due to the fixing band 10 is the same as the first embodiment.

[When Large-Diameter Duct is Disposed]

Figure 15A:
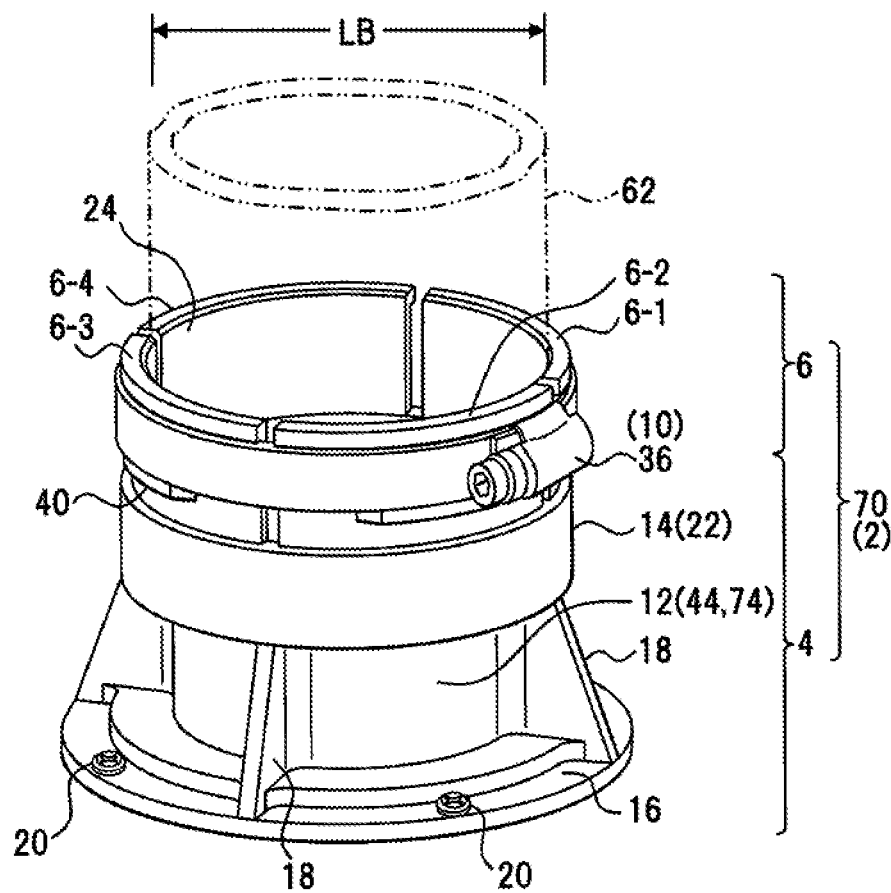
FIG. 15A is a view of an example of the piping connection unit when a large-diameter duct is disposed.
Figure 15B:
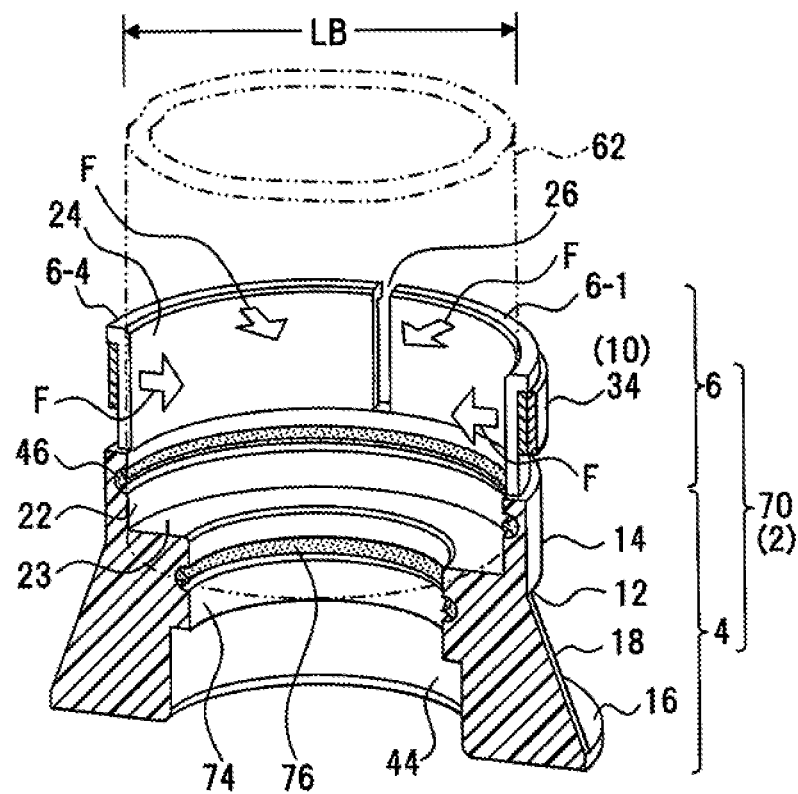
FIG. 15B is a view of an example of a pressing state for the duct to be connected.

FIGS. 15A and 15B show a configuration example when a large-diameter duct is disposed. The configuration shown in FIGS. 15A and 15B is an example.

In the piping connection unit 70, for example, when the duct 62 having the pipe diameter LB larger than the pipe diameter LA is inserted as a duct having a second pipe diameter, the spacers 72-1, 72-2 are removed from the opening part 24, and the supporting pieces 6-1, 6-2, 6-3, 6-4 come into contact with the outer circumferential surface of the duct 62. Inside the main body, for example, as shown in FIG. 15B, the inner wall surface of the connecting part 22 comes into contact with the outer circumferential surface of the duct 62. In this case, the insertion position of the duct 62 inserted in the accommodating part 22 is specified by an end portion on the inserted side arranged on the placement surface part 23. The accommodating part 22 is an example of the second connecting part of the piping connection unit 70 connected to the large-diameter duct 62.

In this case, the duct 62 is not inserted into the penetrating part 74 of the piping connection unit 70. Thus, the air supplied or discharged through the duct 62 passes through the inside of the penetration portion 74. In other words, the penetrating part 74 functions as a connecting part for the small-diameter duct 60 and also functions as a flow passage allowing communication between the large-diameter duct 62 and the accommodating part 44 side.

Additionally, the pressing state of the fixing band 10 against the outer circumferential portion of the duct 62 is the same as the first embodiment.

[Connection of Air Supply Part and Exhaust Part]

Figure 16A:
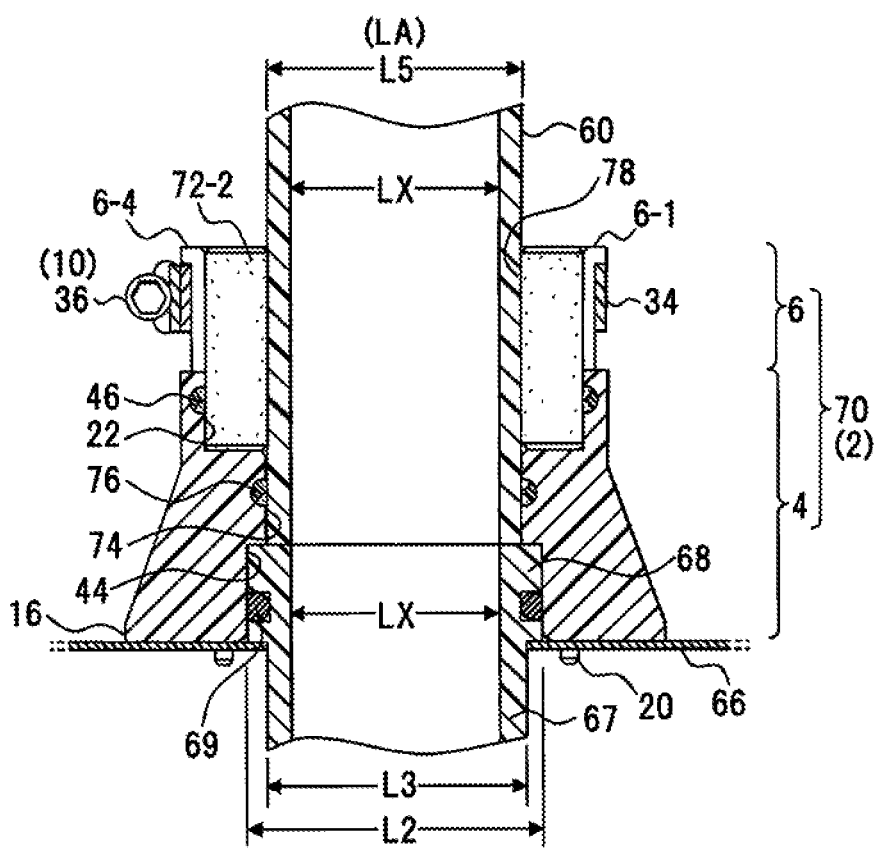
FIGS. 16A and 16B are cross-sectional views of an example of a connection state between the air supply or exhaust part on the equipment side and the duct.
Figure 16B:
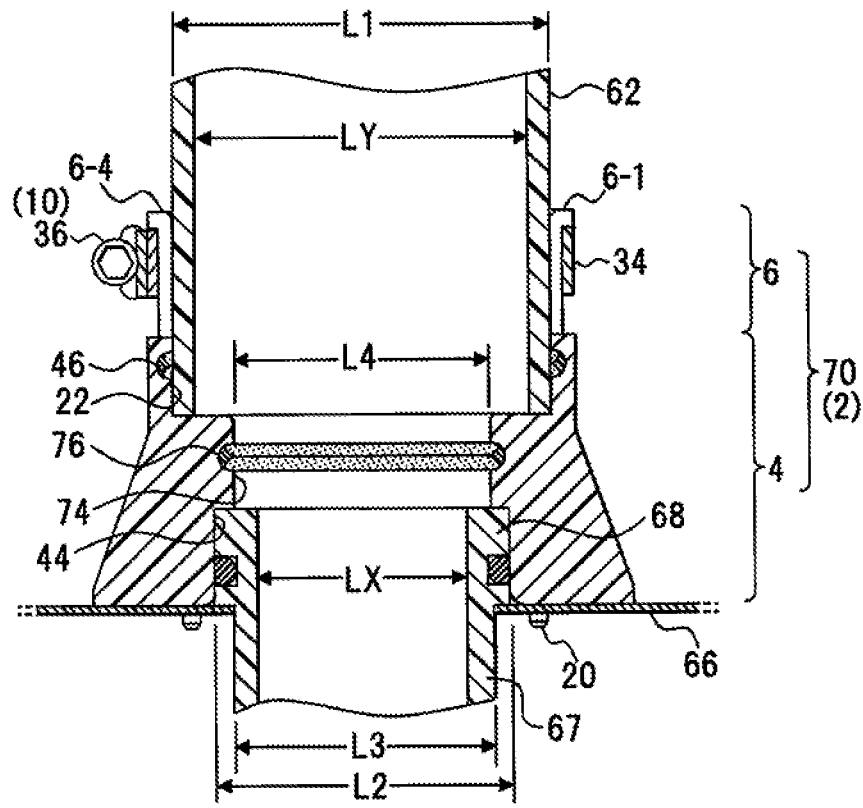

FIGS. 16A and 16B show an example of a connection state between the air supply or exhaust part and the duct.

The piping connection unit 70 is connected via the flange 16 to the disposition part 66 such as a housing part of a combustion apparatus, for example.

When the small-diameter duct 60 is connected to the piping connection unit 70, for example, as shown in FIG.

16A, the leading end portion of the duct 60 is arranged inside the penetrating part 74 and directly connected to the end portion of the connecting pipe 68 of the air supply part or the exhaust part arranged in the accommodating part 44 so that a ventilation flow passage is formed. In this case, the duct 60 and the connecting pipe 68 both form the flow passage having the bore diameter LX of two inches, for example. The duct 60 and the connecting pipe 68 have the same pipe diameter LA and are arranged concentrically with each other. In other words, the duct 60 and the connecting pipe 68 have the same central axis. Thus, a supply flow passage or an exhaust flow passage is formed with little level difference in a connecting portion.

When the large-diameter duct 62 is connected to the piping connection unit 70, for example, as shown in FIG. 16B, the duct 62 arranged in the accommodating part 22 is allowed to communicate with the connecting pipe 68 through the penetrating part 74 having the opening diameter L4 larger than the connecting pipe 68 having the bore diameter LX. As a result, for example, when air is supplied, the piping connection unit 70 forms a flow passage having the inner diameter reduced in stages from the large-diameter duct 62 toward the connecting pipe 68 of the air supply part. Conversely, for example, when air is discharged, the piping connection unit 70 forms a flow passage having the inner diameter expanded in stages from the small-diameter connecting pipe 68 of the exhaust part through the penetrating part 74 toward the duct 62.

Effects of the Second Embodiment

According to this configuration, the following effects can be obtained.

(1) The duct, and the air supply part or the exhaust part of the combustion apparatus can form a ventilation flow passage by using the duct different in pipe diameter.

(2) When the combustion apparatus is installed, a replacement work is not necessary for the duct for supplying or discharging air, so that a work load reduction, a user's convenience, and a cost reduction can be achieved.

(3) Regarding the penetrating part communicating with the connecting part on the air supply part side or the exhaust part side, the duct is connected inside the penetrating part in the case of the small pipe diameter, while the duct is connected in contact with the inner wall and the placement surface part of the accommodating part adjacent to the penetrating part in the case of the large pipe diameter, so as to maintain the connection strength of the duct.

(4) By removing the spacers from the accommodating part corresponding to the large pipe diameter, a contact area can be made larger to increase the connection strength of the duct.

(5) The multiple connecting parts different in diameter and the connecting part disposed with the air supply part or the exhaust part are concentrically arranged and communicate with each other. The insertion amount of the duct is differentiated, and the spacers are interposed. As a result, the direction of disposition and the state of disposition can be standardized for the ducts different in pipe diameter so as to facilitate the assembly work and reduce the workload.

(6) For the ducts different in pipe diameter, the connection positions of the ducts are made different to change the diameter of the flow passage in stages for the air supply part or the exhaust part. Thus, the air can be prevented from stagnating in the flow passage, so that the air supply or exhaust function can be maintained.

Example

Figure 17:
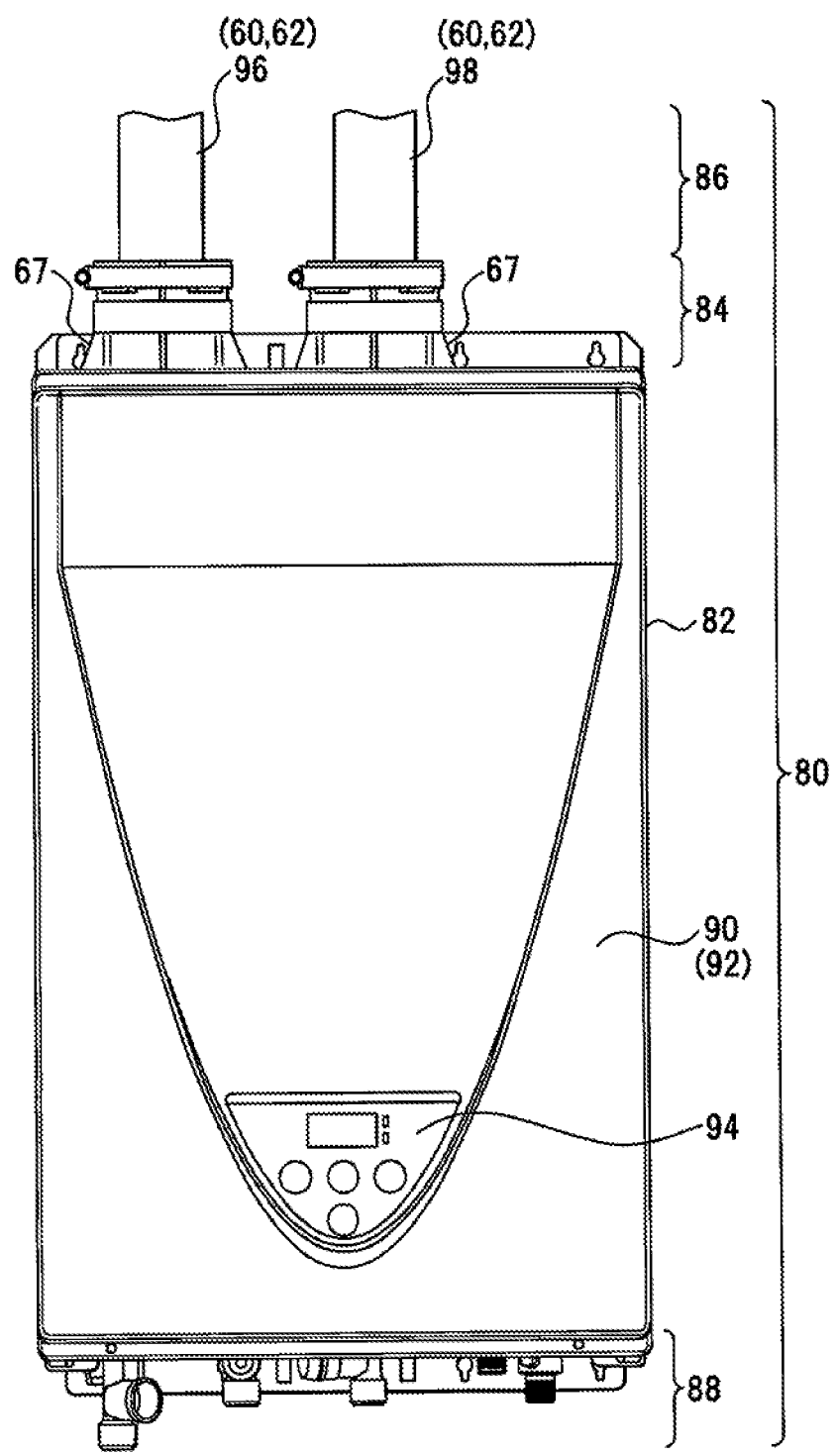
FIG. 17 is a view of an exterior configuration example of a water heater.

FIG. 17 shows a configuration example of a water heater according to Example. The configuration shown in FIG. 17 is an example, and the present invention is not limited to this configuration.

A water heater 80 is an example of the combustion apparatus of the present disclosure and combusts a supplied air and a fuel gas with a combustion means such as a burner to supply hot water heated by the combustion exhaust or to perform reheating of bathwater etc.

For example, as shown in FIG. 17, the water heater 80 includes a main body part 82, an air supply and exhaust tube part 84, a piping part 86, and a piping connecting part 88.

The main body part 82 includes an accommodating part 92 made up of a metallic box-shaped exterior housing 90, for example, and the accommodating part 92 accommodates a combustion means, a heat exchanger, an air supply or exhaust part, etc. in the accommodating part 92. The air supply and exhaust tube part 84 is an example of a function component including an air supply part supplying air to the combustion means in the accommodating part 92 and an exhaust part discharging to the outside a combustion exhaust generated from the combustion means and subjected to the heat exchange. The piping connection unit 2, 70 of the present disclosure are included in the air supply and exhaust tube part 84.

The piping part 86 is an example of piping equipment including an air supply pipe 96 and an exhaust pipe 98 arranged to the outside of a building in which the water heater 80 is installed.

The piping connecting part 88 is an example of a connecting function part connecting a gas pipe for taking in the fuel gas to supply the fuel gas to the water heater 80, a water supply pipe for taking in water before heat exchange or a hot-water supply pipe for discharging hot water after heat exchange, etc.

The water heater 80 also includes a display operation part 94 arranged as a portion of the exterior housing, for example, on a front surface portion, and provided with a display portion, operation buttons, etc. The display operation part 94 has functions of setting a hot-water supply temperature of the water heater 80, inputting a hot-water supply operation, displaying a temperature, etc.

Figure 18:
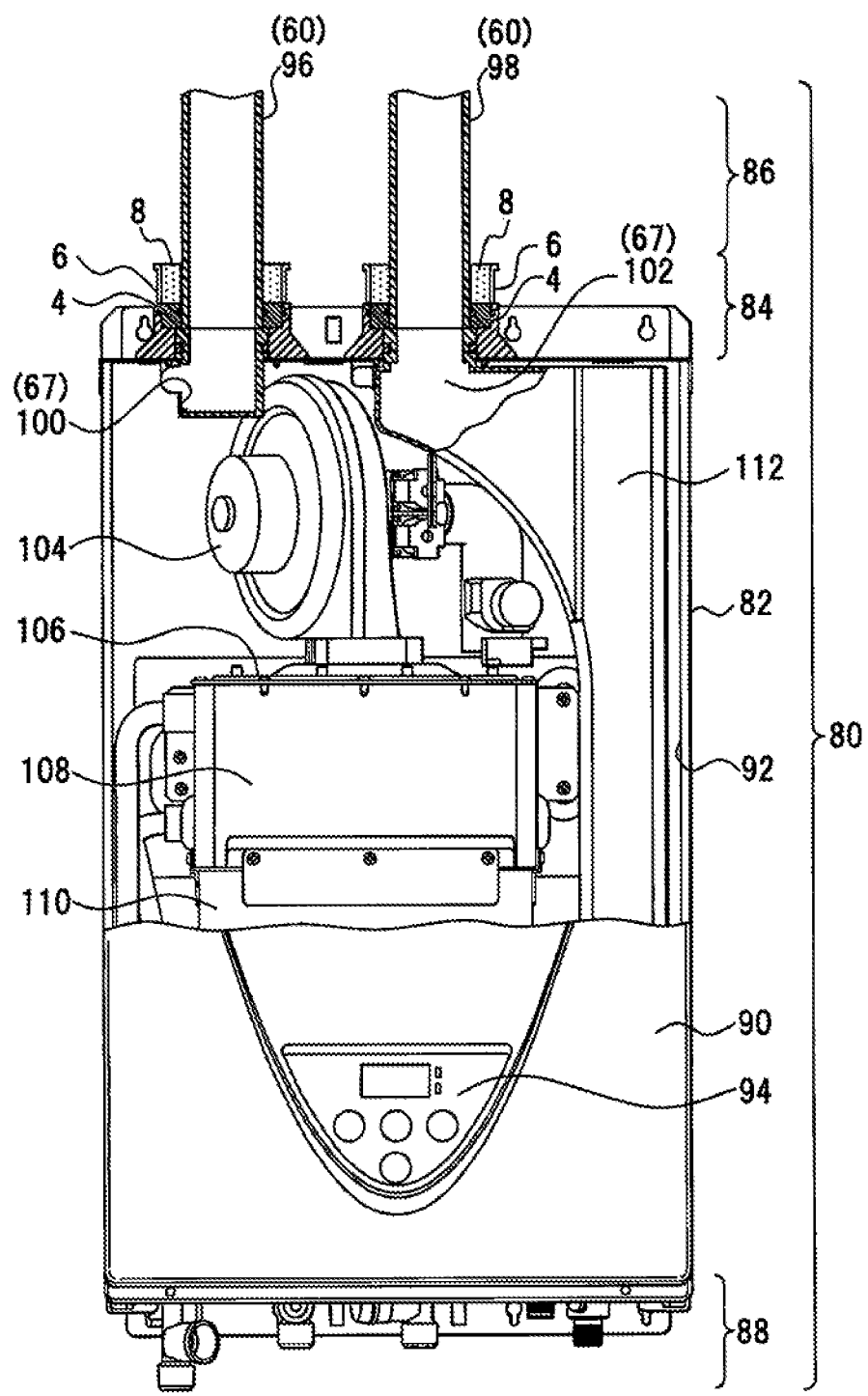
FIG. 18 is a view of an internal configuration example of the water heater when a small-diameter duct is connected.

In the water heater 80, for example, as shown in FIG. 18, the air supply pipe 96 is connected to an air supply part 100 through the piping connection unit constituting the air supply and exhaust tube part 84, and the exhaust pipe 98 is connected to an exhaust part 102.

The accommodating part 92 accommodates, for example, an air supply fan 104 connected to the air supply part 100, a burner 106 combusting the air supplied through the air supply fan 104 and the fuel gas, a first heat exchange part 108, a second heat exchange part 110, and an exhaust pipe 112.

The air supply fan 104 is an example of a means taking in an outside air through the air supply part 100 and supplying a compressed air toward the burner 106.

The burner 106 is an example of a combustion means and includes, for example, a surface burner having flame holes arranged on a plane and generating a combustion exhaust. The burner 106 may be a burner having a metal knit placed on a flame hole surface, for example.

The first heat exchange part 108 is an example of a means having disposed multiple annular rings not shown, for example, allowing water etc. serving as a fluid to be heated to flow in the annular rings, and mainly recovering a sensible heat of the combustion exhaust generated by the burner 106. Similar to the first heat exchange part 108, the second heat exchange part 110 is an example of a means having disposed multiple pipes allowing the water etc. to flow in the multiple pipes, and mainly recovering a latent heat from the combustion exhaust generated by the burner 106.

Although the water heater 80 is described as a so-called secondary heat exchanger including the first heat exchange part 108 and the second heat exchange part 110, the present invention is not limited thereto. Only one heat exchange part may be included for the combustion exhaust.

The exhaust pipe 112 is an example of a pipe allowing the combustion exhaust after the heat exchange to flow toward the exhaust part 102.

This water heater 80 includes the air supply pipe 96 and the exhaust pipe 98. The air supply pipe 96 and the exhaust pipe 98 have the same diameter as the air supply part 100 and the exhaust part 102. In this case, the piping connection unit 2 of the air supply and exhaust tube part 84 has the spacer 8 interposed in the accommodating part 22 and the opening part 24 to enable connection of the air supply pipe 96 or the exhaust pipe 98.

Figure 19:
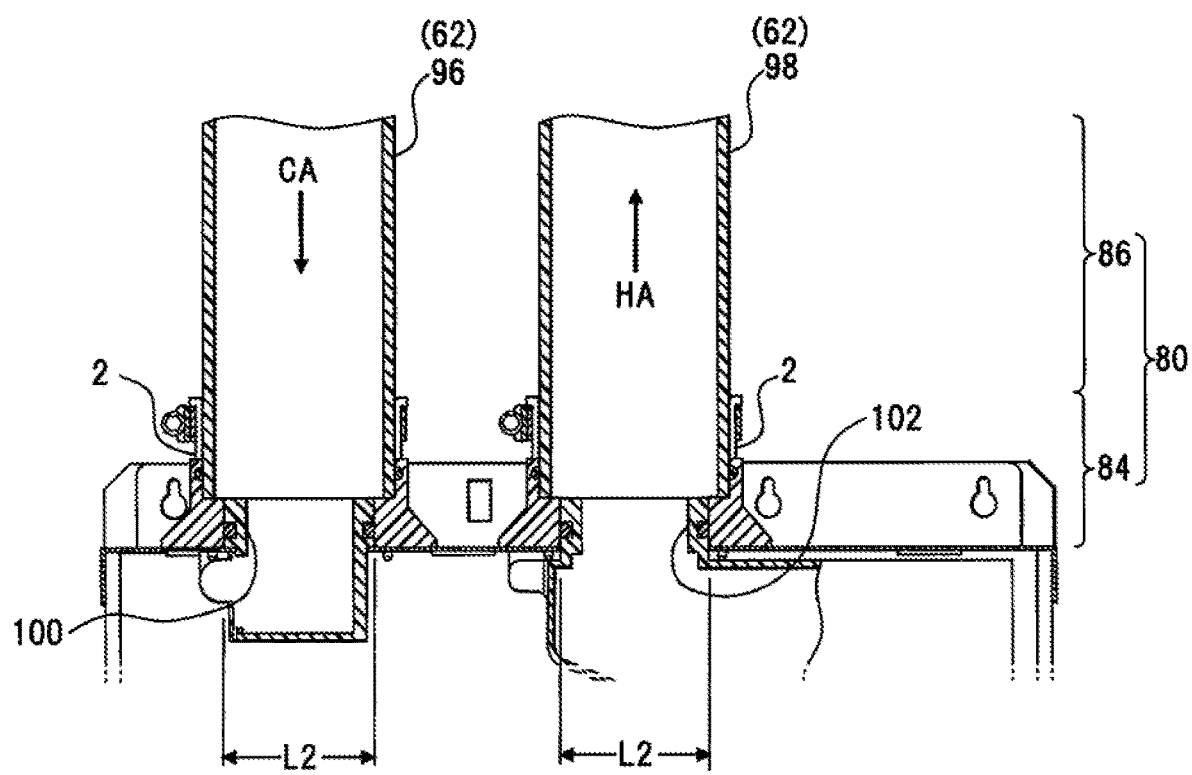
FIG. 19 is a view of a configuration example of the air supply or exhaust part when a large-diameter duct is connected.

For example, as shown in FIG. 19, the water heater 80 includes the air supply pipe 96 and the exhaust pipe 98. The air supply pipe 96 and the exhaust pipe 98 have larger diameters as compared to the air supply part 100 and the exhaust part 102. In this case, the spacer 8 is removed from the accommodating part 22, and the outer circumferential surface of the air supply pipe 96 or the exhaust pipe 98 is brought into contact with the inner walls of the accommodating part 22 and the opening part 24 to connect the piping connection unit 2 to the air supply pipe 96 or the exhaust pipe 98.

The water heater 80 takes in a combustion air CA through the air supply pipe 96 connected to the main body part 82 via the piping connection unit 2 and discharges a combustion exhaust HA after the heat exchange in the heat exchange parts 108, 110.

In this Example, the piping connection unit 2 according to the first embodiment is used as the structure of the air supply and exhaust tube part of the water heater 80. However, the present invention is not limited thereto. The water heater 80 may use the piping connection unit 70 according to the second embodiment.

Effects of Example

According to this configuration, the following effects can be obtained.

(1) The duct, and the air supply part or the exhaust part of the water heater can form a ventilation flow passage by using the duct different in pipe diameter.

(2) When the water heater is installed, a replacement work is not necessary for the duct for supplying or discharging air, so that a work load reduction, an improvement in user's convenience, and a cost reduction can be achieved.

(3) Since the water heater to be installed is not limited regardless of pipe diameter of the air supply pipe or the exhaust pipe existing in the building, the user's convenience is improved.

(4) If the pipe diameter is different between the air supply or exhaust part on the water heater 80 side and the duct, it is not necessary to connect multiple pipes for matching the pipe diameter so that the number of coupling portions of piping can be reduced, and thus, the possibility of leakage of supply air or exhaust air can be reduced to enhance the safety.

Other Embodiments (1) Although the two spacers 72-1, 72-2 are used in the second embodiment, the present invention is not limited thereto. Three or more spacers may be used. The number of spacers and the number of supporting pieces of the supporting part 6 may be the same.

(2) The slits 26, 32 of the supporting part 6 and the spacer 8 are not limited to those formed linearly at an angle parallel to or nearly parallel to the insertion or extraction direction of the duct. The slits may be formed in an oblique direction relative to the insertion or extraction direction of the duct, for example. The direction of the slits may be adjusted depending on a fastening direction, or a direction of action of the fastening force, of the fixing band 10 pressing the supporting band 6 and the slits so that the force evenly acts on the outer circumferential surface of the duct or that a portion of the duct is strongly pressed.

(3) In the embodiments and Example, the small-diameter duct 60 having the pipe diameter LA and the large-diameter duct 62 having the pipe diameter LB are described as the ducts 60, 62 connected to the piping connection units 2, 70. However, the present invention is not limited thereto. Ducts to be used may have any diameter as long as the ducts have a pipe diameter capable of maintaining the air supply function or the exhaust function of the combustion apparatus.

Figure 20A:
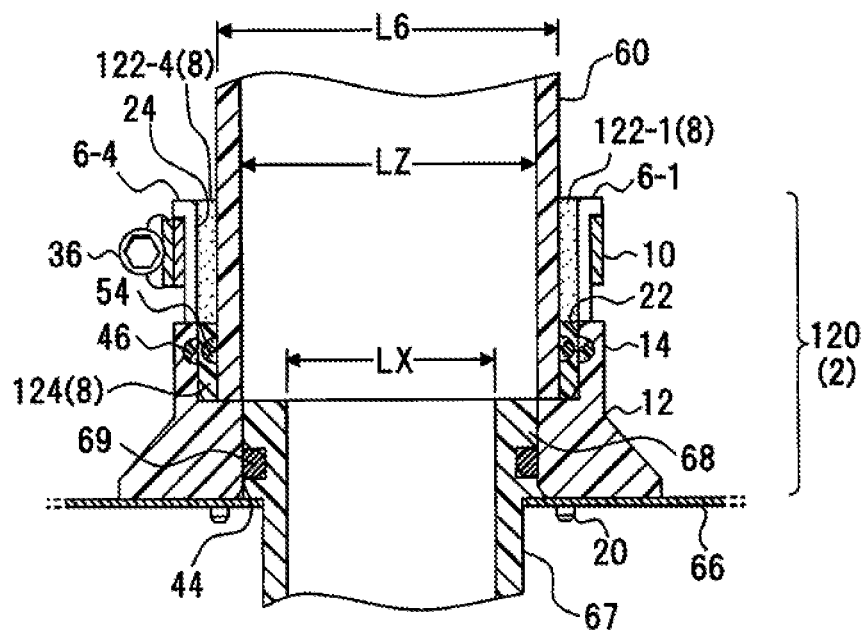
FIGS. 20A and 20B are views of a configuration example of a piping connection unit according to another embodiment.

Specifically, for example, as shown in FIG. 20A, a piping connection unit 120 may use a duct having a pipe diameter L6 smaller than the inner diameter of the supporting part 6 and the accommodating part 22. In this case, the piping connection unit 120 may use spacers 122-1, 122-2, 122-3, 122-4 having a thickness d2 that is a difference between the pipe diameter L6 and the inner diameter L1 that the accommodating part 22 and the opening part 24 have, for example. The spacers 122-1, 122-2, 122-3, 122-4 may be provide with an annular part 124 along the inner wall of the accommodating part 22, for example. The O-ring 54 coming into contact with the outer circumferential portion of the duct 60 is disposed on the inner wall of the annular part 124.

Figure 20B:
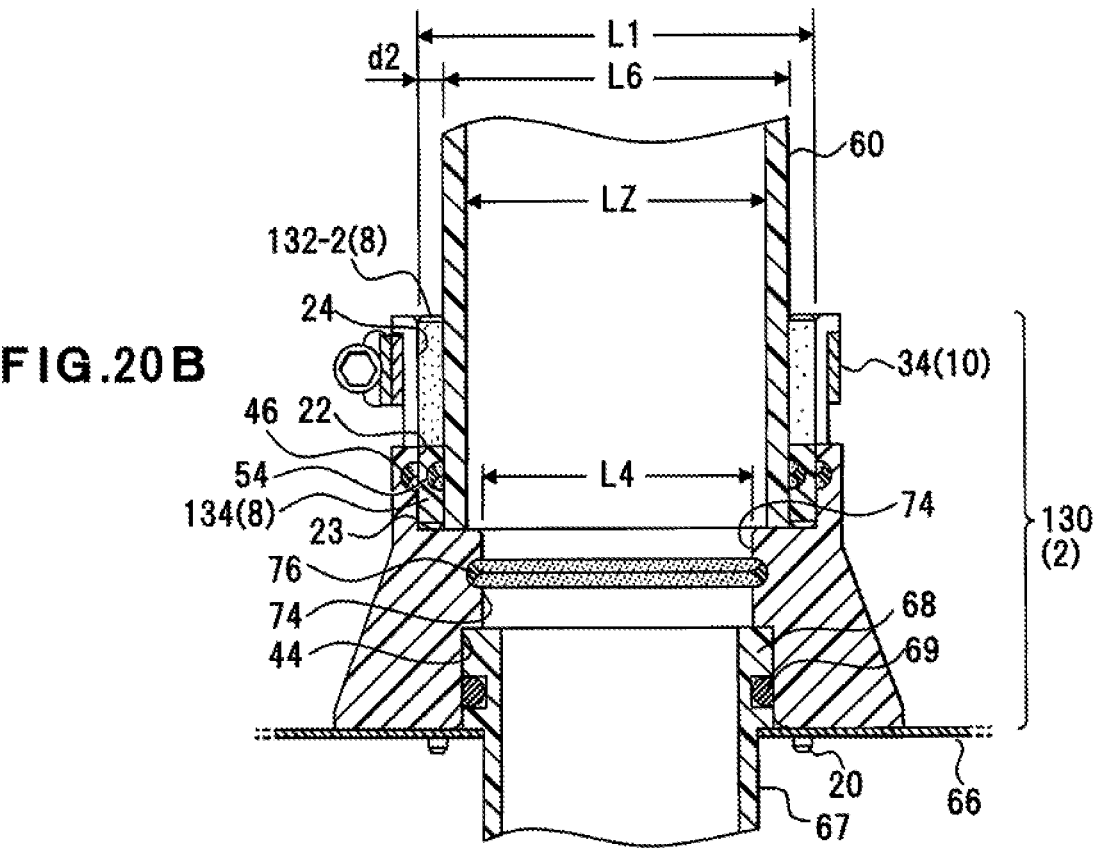

Similarly, for example, as shown in FIG. 20B, a piping connection unit 130 may use spacers 132-1, 132-2 having a thickness d2 corresponding to a pipe diameter L6 to accommodate the duct 60 in the accommodating part 22 and the opening part 24. The spacers 132-1, 132-2 may be provide with an annular part 134 along the inner wall of the accommodating part 22, for example. The O-ring 54 coming into contact with the outer circumferential portion of the duct 60 is disposed on the inner wall of the annular part 134.

Thus, the piping connection units 120, 130 may use ducts having any pipe diameter as long as the pipe diameter is larger than a bore diameter LZ required for supplying or discharging air and smaller than the pipe diameter L1 that can be accommodated in the accommodating part 22.

Aspects of the piping connection unit, the air supply or exhaust tube, or the combustion apparatus extracted from the embodiments or the example described above are as follows.

The piping connection unit of a combustion apparatus supplying and discharging air through a duct includes an apparatus-side connecting part to be connected to an air supply part or an exhaust part of the combustion apparatus;

a connecting part having a diameter larger than a diameter of the apparatus-side connecting part, and communicating with the apparatus-side connecting part to be connected to a duct to be inserted from an opening part; and a spacer detachably disposed in the connecting part, the spacer being disposed between an inner wall of the connecting part and the duct to be inserted when the duct has a pipe diameter smaller than an inner diameter of the connecting part, the spacer being removed from the connecting part when the duct has a pipe diameter equivalent to the inner diameter of the connecting part. The piping connection unit allows the air to flow through the duct, and the air supply part or the exhaust part.

In the piping connection unit, the apparatus-side connecting part and the connecting part may be concentric with each other.

In the piping connection unit, the piping connection unit may further include a supporting part disposed along the opening part on the connecting part, having an opening with a diameter equal to or nearly equal to that of the connecting part, and coming into contact with an outer circumferential portion of the inserted duct to support the duct. The supporting part may include slits at predetermined angular intervals for the opening part. The slits may be formed parallel to or nearly parallel to an insertion or extraction direction of the duct.

In the piping connection unit, the piping connection unit may further include a pressing means disposed along an outer circumferential portion of the supporting part to press the supporting part in a direction in which the opening diameter of the supporting part is narrowed. The supporting part pressed by the pressing means may press the duct or presses the duct via the spacer.

In the piping connection unit, the piping connection unit may further include a first sealing means disposed on an inner wall surface of the connecting part and sealing between the inner wall surface of the connecting part and the duct or between the inner wall surface of the connecting part and the spacer.

In the piping connection unit, the spacer may include slits at predetermined angular intervals at least in the supporting part. The slits of the spacer may extend in a direction parallel to or nearly parallel to the insertion or extraction direction of the duct. The slits of the spacer may overlap with the slits of the supporting part.

In the piping connection unit, the spacer may include an annular part along an inner circumferential surface of the connecting part, the duct being inserted into the annular part for the duct and the connecting part to be concentric with each other. The piping connection unit may further include a second sealing member disposed on an inner wall of the annular part, the second sealing member sealing a contact portion between the annular part and the duct.

In the piping connection unit, the connecting part may include a first connecting part communicating with the apparatus-side connecting part, the first connecting part being connectable to the duct having a first pipe diameter; and a second connecting part communicating with the apparatus-side connecting part through the first connecting part, the second connecting part being connectable to the duct having a second pipe diameter larger than the first pipe diameter. The spacer may be disposed in the second connecting part in the case of connection with the duct having a pipe diameter smaller than an inner diameter of the second connecting part.

In the piping connection unit, the first connecting part may include a third sealing means on an inner wall surface, the third sealing means sealing between the first connecting part and the duct having the first pipe diameter.

The air supply or exhaust tube of a combustion apparatus supplying and discharging air through a duct includes an air supply part allowing an outside air to flow toward a combustion part; an exhaust part allowing a combustion exhaust after heat exchange to flow; an apparatus-side connecting part connected to the air supply part or the exhaust part; a connecting part having a diameter larger than a diameter of the apparatus-side connecting part, and communicating with the apparatus-side connecting part to be connected to a duct to be inserted from an opening part; and a spacer detachably disposed in the connecting part, the spacer being disposed between an inner wall of the connecting part and the duct to be inserted when the duct has a pipe diameter smaller than an inner diameter of the connecting part, the spacer being removed from the connecting part when the duct has a pipe diameter equivalent to the inner diameter of the connecting part. The air supply or exhaust tube allows the air to flow through the duct, and the air supply part or the exhaust part.

In the air supply or exhaust tube, the air supply or exhaust tube may further include a supporting part disposed along the opening part on the connecting part, having an opening with a diameter equal to or nearly equal to that of the connecting part, and coming into contact with an outer circumferential portion of the inserted duct to support the duct. The supporting part may include slits at predetermined angular intervals for the opening part. The slits may be formed parallel to or nearly parallel to an insertion or extraction direction of the duct.

In the air supply or exhaust tube, the connecting part may include a first connecting part communicating with the apparatus-side connecting part, the first connecting part being connectable to the duct having a first pipe diameter; and a second connecting part communicating with the apparatus-side connecting part through the first connecting part, the second connecting part being connectable to the duct having a second pipe diameter larger than the first pipe diameter. The spacer may be disposed in the second connecting part in the case of connection with the duct having a pipe diameter smaller than an inner diameter of the second connecting part.

The combustion apparatus supplying and discharging air through a duct includes an air supply part allowing an outside air to flow toward a combustion part; an exhaust part allowing a combustion exhaust after heat exchange to flow; an apparatus-side connecting part connected to the air supply part or the exhaust part; a connecting part having a diameter larger than a diameter of the apparatus-side connecting part, and communicating with the apparatus-side connecting part to be connected to a duct to be inserted from an opening part; and a spacer detachably disposed in the connecting part, the spacer being disposed between an inner wall of the connecting part and the duct to be inserted when the duct has a pipe diameter smaller than an inner diameter of the connecting part, the spacer being removed from the connecting part when the duct has a pipe diameter equivalent to the inner diameter of the connecting part. The combustion apparatus allows the air to flow through the duct, and the air supply part or the exhaust part.

In the combustion apparatus, the combustion apparatus may further include a supporting part disposed along the opening part on the connecting part, having an opening with a diameter equal to or nearly equal to that of the connecting part, and coming into contact with an outer circumferential portion of the inserted duct to support the duct. The supporting part may include slits at predetermined angular intervals for the opening part. The slits may be formed parallel to or nearly parallel to an insertion or extraction direction of the duct.

In the combustion apparatus, the connecting part may include a first connecting part communicating with the apparatus-side connecting part, the first connecting part being connectable to the duct having a first pipe diameter; and a second connecting part communicating with the apparatus-side connecting part through the first connecting part, the second connecting part being connectable to the duct having a second pipe diameter larger than the first pipe diameter. The spacer may be disposed in the second connecting part in the case of connection with the duct having a pipe diameter smaller than an inner diameter of the second connecting part.

According to aspects of the embodiments or the example, any of the following effects can be obtained.

(1) Since the piping connection unit includes the connecting part capable of connecting a duct having a diameter larger than the diameter required for supplying air to the combustion apparatus or for discharging air from the combustion apparatus so as to adapt to a diameter of an existing duct, a replacement work is not necessary for the duct so that a work load of installation of the combustion apparatus can be reduced.

(2) Only by replacing the spacer, a flow passage can be formed between a duct different in pipe diameter, and the air supply part or the exhaust part of the combustion apparatus.

(3) By interposing the spacer in the connecting part for a duct having a diameter smaller than the opening part of the connecting part, the connectivity between the piping connection unit and the duct is improved, and the safety of the combustion apparatus is improved.

As described above, the most preferable embodiments etc. of the present disclosure have been described. The present invention is not limited to the above description. Various modifications and changes can be made by those skilled in the art based on the contents described in claims or disclosed in detailed description of the invention. Such modifications and changes obviously fall within the scope of the present disclosure.

The piping connecting unit, the air supply or exhaust tube, and the combustion apparatus of the present disclosure are useful since connection can be made to a duct having a pipe diameter equivalent to or larger than the pipe diameter of the air supply part or the exhaust part on the equipment side without replacement of the duct.

The invention claimed is:

1. A piping connection unit of a combustion apparatus configured to supply and discharge air through a duct, the piping connection unit comprising:
   an apparatus-side connecting part to be connected to an air supply part or an exhaust part of the combustion apparatus;
   a connecting part having a diameter larger than a diameter of the apparatus-side connecting part, and communicating with the apparatus-side connecting part to be connected to a duct to be inserted from an opening part;
   a spacer detachably disposed in the connecting part, the spacer being disposed between an inner wall of the connecting part and the duct to be inserted when the duct has a pipe diameter smaller than an inner diameter of the connecting part, the spacer being removed from the connecting part when the duct has a pipe diameter equivalent to the inner diameter of the connecting part; and
   a sealing member disposed on an inner wall surface of the connecting part or on an inner wall surface of the spacer,
   wherein the piping connection unit allows the air to flow through the duct, and the air supply part or the exhaust part.

2. The piping connection unit according to claim 1, wherein the apparatus-side connecting part and the connecting part are concentric with each other.

3. The piping connection unit according to claim 1, wherein the sealing member is disposed on the inner wall surface of the connecting part and seals between the inner wall surface of the connecting part and the duct or between the inner wall surface of the connecting part and the spacer.

4. The piping connection unit according to claim 1, wherein
   the spacer includes an annular part along an inner circumferential surface of the connecting part, the duct being configured to be inserted into the annular part for the duct and the connecting part to be concentric with each other, and
   the sealing member is disposed on the inner wall surface of the annular part of the spacer and seals a contact portion between the annular part and the duct.

5. The piping connection unit according to claim 1, wherein the connecting part includes:
   a first connecting part communicating with the apparatus-side connecting part, the first connecting part being connectable to the duct having a first pipe diameter; and
   a second connecting part communicating with the apparatus-side connecting part through the first connecting part, the second connecting part being connectable to the duct having a second pipe diameter larger than the first pipe diameter, and
   wherein the spacer is disposed in the second connecting part in the case of connection with the duct having a pipe diameter smaller than an inner diameter of the second connecting part.

6. The piping connection unit according to claim 5, wherein the sealing member is disposed on the inner wall surface of the first connecting part of the connecting part and seals between the first connecting part and the duct having the first pipe diameter.

7. A piping connection unit of a combustion apparatus configured to supply and discharge air through a duct, the piping connection unit comprising:
   an apparatus-side connecting part to be connected to an air supply part or an exhaust art of the combustion apparatus;
   a connecting part having a diameter larger than a diameter of the apparatus-side connecting part, and communicating with the apparatus-side connecting part to be connected to a duct to be inserted from an opening part;
   a spacer detachably disposed in the connecting part, the spacer being disposed between an inner wall of the connecting part and the duct to be inserted when the duct has a pipe diameter smaller than an inner diameter of the connecting part, the spacer being removed from the connecting part when the duct has a pipe diameter equivalent to the inner diameter of the connecting part; and
   a supporting part disposed along the opening part on the connecting part, having an opening with a diameter equal to or nearly equal to that of the connecting part, and being configured to come into contact with an outer circumferential portion of the duct to be inserted to support the duct, wherein the piping connection unit allows the air to flow through the duct, and the air supply part or the exhaust part, the supporting part includes slits at predetermined angular intervals for the opening part, and wherein the slits are formed parallel to or nearly parallel to an insertion or extraction direction of the duct, the spacer includes slits at predetermined angular intervals at least in the supporting part, the slits of the spacer extending in a direction parallel to or nearly parallel to the insertion or extraction direction of the duct, and the slits of the spacer overlap with the slits of the supporting part.

8. The piping connection unit according to claim 7, further comprising a pressing means disposed along an outer circumferential portion of the supporting part to press the supporting part in a direction in which the opening diameter of the supporting part is narrowed, wherein the supporting part pressed by the pressing means presses the duct or presses the duct via the spacer.

9. An air supply or exhaust tube of a combustion apparatus configured to supply and discharge air through a duct, the air supply or exhaust tube comprising:

an air supply part allowing an outside air to flow toward a combustion part;

an exhaust part allowing a combustion exhaust after heat exchange to flow;

an apparatus-side connecting part connected to the air supply part or the exhaust part;

a connecting part having a diameter larger than a diameter of the apparatus-side connecting part, and communicating with the apparatus-side connecting part to be connected to a duct to be inserted from an opening part;

a spacer detachably disposed in the connecting part, the spacer being disposed between an inner wall of the connecting part and the duct to be inserted when the duct has a pipe diameter smaller than an inner diameter of the connecting part, the spacer being removed from the connecting part when the duct has a pipe diameter equivalent to the inner diameter of the connecting part; and a sealing member disposed on an inner wall surface of the connecting part or on an inner wall surface of the spacer, wherein the air supply or exhaust tube allows the air to flow through the duct, and the air supply part or the exhaust part.

10. The air supply or exhaust tube according to claim 9, wherein the connecting part includes:

a first connecting part communicating with the apparatus-side connecting part, the first connecting part being connectable to the duct having a first pipe diameter; and a second connecting part communicating with the apparatus-side connecting part through the first connecting part, the second connecting part being connectable to the duct having a second pipe diameter larger than the first pipe diameter, and wherein the spacer is disposed in the second connecting part in the case of connection with the duct having a pipe diameter smaller than an inner diameter of the second connecting part.

11. An air supply or exhaust tube of a combustion apparatus being configured to supply and discharge air through a duct, the air supply or exhaust tube comprising:

an air supply part allowing an outside air to flow toward a combustion part;

an exhaust part allowing a combustion exhaust after heat exchange to flow;

an apparatus-side connecting part connected to the air supply part or the exhaust part;

a connecting part having a diameter larger than a diameter of the apparatus-side connecting part, and communicating with the apparatus-side connecting part to be connected to a duct to be inserted from an opening part;

a spacer detachably disposed in the connecting part, the spacer being disposed between an inner wall of the connecting part and the duct to be inserted when the duct has a pipe diameter smaller than an inner diameter of the connecting part, the spacer being removed from the connecting part when the duct has a pipe diameter equivalent to the inner diameter of the connecting part; and a supporting part disposed along the opening part on the connecting part, having an opening with a diameter equal to or nearly equal to that of the connecting part, and being configured to come into contact with an outer circumferential portion of the duct to be inserted to support the duct, wherein the air supply or exhaust tube allows the air to flow through the duct, and the air supply part or the exhaust part, the supporting part includes slits at predetermined angular intervals for the opening part, and wherein the slits are formed parallel to or nearly parallel to an insertion or extraction direction of the duct, the spacer includes slits at predetermined angular intervals at least in the supporting part, the slits of the spacer extending in a direction parallel to or nearly parallel to the insertion or extraction direction of the duct, and the slits of the spacer overlap with the slits of the supporting part.

12. A combustion apparatus configured to supply and discharge air through a duct, the combustion apparatus comprising:

an air supply part allowing an outside air to flow toward a combustion part;

an exhaust part allowing a combustion exhaust after heat exchange to flow;

an apparatus-side connecting part connected to the air supply part or the exhaust part;

a connecting part having a diameter larger than a diameter of the apparatus-side connecting part, and communicating with the apparatus-side connecting part to be connected to a duct to be inserted from an opening part;

a spacer detachably disposed in the connecting part, the spacer being disposed between an inner wall of the connecting part and the duct to be inserted when the duct has a pipe diameter smaller than an inner diameter of the connecting part, the spacer being removed from the connecting part when the duct has a pipe diameter equivalent to the inner diameter of the connecting part; and a sealing member disposed on an inner wall surface of the connecting part or an inner wall surface of the spacer, wherein the combustion apparatus allows the air to flow through the duct, and the air supply part or the exhaust part.

13. The combustion apparatus according to claim 12, wherein the connecting part includes:

a first connecting part communicating with the apparatus-side connecting part, the first connecting part being connectable to the duct having a first pipe diameter; and a second connecting part communicating with the apparatus-side connecting part through the first connecting part, the second connecting part being connectable to the duct having a second pipe diameter larger than the first pipe diameter, and wherein the spacer is disposed in the second connecting part in the case of connection with the duct having a pipe diameter smaller than an inner diameter of the second connecting part.

14. A combustion apparatus being configured to supply and discharge air through a duct, the combustion apparatus comprising:

an air supply part allowing an outside air to flow toward a combustion part;

an exhaust part allowing a combustion exhaust after heat exchange to flow;

an apparatus-side connecting part connected to the air supply part or the exhaust part;

a connecting part having a diameter larger than a diameter of the apparatus-side connecting part, and communicating with the apparatus-side connecting part to be connected to a duct to be inserted from an opening part;

a spacer detachably disposed in the connecting part, the spacer being disposed between an inner wall of the connecting part and the duct to be inserted when the duct has a pipe diameter smaller than an inner diameter of the connecting part, the spacer being removed from the connecting part when the duct has a pipe diameter equivalent to the inner diameter of the connecting part; and a supporting part disposed along the opening part on the connecting part, having an opening with a diameter equal to or nearly equal to that of the connecting part, and being configured to come into contact with an outer circumferential portion of the duct to be inserted to support the duct, wherein the combustion apparatus allows the air to flow through the duct, and the air supply part or the exhaust part, the supporting part includes slits at predetermined angular intervals for the opening part, and wherein the slits are formed parallel to or nearly parallel to an insertion or extraction direction of the duct, the spacer includes slits at predetermined angular intervals at least in the supporting part, the slits of the spacer extending in a direction parallel to or nearly parallel to the insertion or extraction direction of the duct, and the slits of the spacer overlap with the slits of the supporting part.

\* \* \* \* \*